United States Patent
Abrams et al.

(10) Patent No.: US 7,395,220 B2
(45) Date of Patent: Jul. 1, 2008

(54) SYSTEM, METHODS AND COMPUTER PROGRAM PRODUCTS FOR OFFERING PRODUCTS BASED ON EXTRAPOLATION OF INPUTS

(75) Inventors: Rachel Abrams, New York, NY (US);
Robert Albert, New York, NY (US);
Damon Tassone, New York, NY (US);
Tracey Weber, New York, NY (US);
David Yong, New York, NY (US)

(73) Assignee: Travelocity.com LP, Southlake, TX (US)

( * ) Notice: Subject to any disclaimer, the term of this patent is extended or adjusted under 35 U.S.C. 154(b) by 0 days.

(21) Appl. No.: 11/215,220

(22) Filed: Aug. 30, 2005

(65) Prior Publication Data

US 2005/0288976 A1 Dec. 29, 2005

Related U.S. Application Data

(63) Continuation-in-part of application No. 09/516,252, filed on Mar. 1, 2000, now Pat. No. 7,092,892.

(60) Provisional application No. 60/607,643, filed on Sep. 7, 2004.

(51) Int. Cl.
*G01C 21/36* (2006.01)
*G01C 21/34* (2006.01)
*G06Q 30/00* (2006.01)

(52) U.S. Cl. ............ 705/6; 705/1; 705/5; 705/26; 705/35; 707/3; 707/5; 709/221

(58) Field of Classification Search .......... 705/5, 705/6, 8, 35, 26, 27, 1; 707/3; 709/221
See application file for complete search history.

(56) References Cited

U.S. PATENT DOCUMENTS

| 5,794,207 A | 8/1998 | Walker et al. |
| 5,797,127 A | 8/1998 | Walker et al. |

(Continued)

FOREIGN PATENT DOCUMENTS

EP    1 148 433 A1    10/2001

(Continued)

OTHER PUBLICATIONS www.lastminute.com web pages, extracted on Internet on Feb. 17, 2000. Total of 32 pages.*

(Continued)

*Primary Examiner*—Yogesh C Garg
(74) *Attorney, Agent, or Firm*—Alston & Bird LLP

(57) ABSTRACT

A computer system for extrapolating from relatively small amounts of information provided by a consumer to generate a wide range of travel options that are still associated with the information provided by the consumer. For example, the system includes processes for generating or finding travel packages with exactly matching travel dates and destinations supplied by the consumer. In addition, the system includes processes for varying the dates of travel by several days, or proximate weekends, and the destination of travel with nearby or regional destinations, so as to generate or find additional travel options. Further, the system can be configured to extract a theme of the consumer requested information and to use this theme to construct or find travel packages with similar or matching themes.

26 Claims, 41 Drawing Sheets

U.S. PATENT DOCUMENTS

| | | | |
|---|---|---|---|
| 5,832,451 | A | 11/1998 | Flake et al. |
| 5,897,620 | A | 4/1999 | Walker et al. |
| 5,897,639 | A | 4/1999 | Greef et al. |
| 6,018,718 | A | 1/2000 | Walker et al. |
| 6,049,778 | A | 4/2000 | Walker et al. |
| 6,119,094 | A | 9/2000 | Lynch et al. |
| 6,128,600 | A | 10/2000 | Imamura et al. |
| 6,138,105 | A | 10/2000 | Walker et al. |
| 6,285,986 | B1 | 9/2001 | Andrews |
| 6,304,850 | B1 | 10/2001 | Keller et al. |
| 6,307,573 | B1 | 10/2001 | Barros |
| 6,360,205 | B1 | 3/2002 | Iyengar et al. |
| 6,434,450 | B1 | 8/2002 | Griffin, Jr. et al. |
| 6,477,520 | B1 | 11/2002 | Malaviya et al. |
| 6,553,346 | B1 | 4/2003 | Walker et al. |
| 6,574,607 | B1 | 6/2003 | Carter et al. |
| 6,609,098 | B1 | 8/2003 | DeMarcken |
| 7,124,087 | B1 * | 10/2006 | Rodriguez et al. .............. 705/1 |
| 2001/0000047 | A1 | 3/2001 | Madamy et al. |
| 2001/0044748 | A1 | 11/2001 | Maier |
| 2002/0010668 | A1 * | 1/2002 | Travis et al. ................... 705/35 |
| 2002/0026336 | A1 | 2/2002 | Eizenburg et al. |
| 2002/0156661 | A1 * | 10/2002 | Jones et al. ..................... 705/6 |
| 2002/0174003 | A1 * | 11/2002 | Redmann et al. ............... 705/8 |
| 2002/0174205 | A1 * | 11/2002 | Nakashima ................. 709/221 |
| 2003/0036930 | A1 * | 2/2003 | Matos et al. .................... 705/5 |
| 2003/0050927 | A1 * | 3/2003 | Hussam .......................... 707/5 |
| 2003/0163779 | A1 * | 8/2003 | Warren ....................... 715/500 |
| 2004/0078213 | A1 * | 4/2004 | Brice et al. .................... 705/1 |
| 2004/0254819 | A1 * | 12/2004 | Halim et al. ................... 705/5 |
| 2005/0234897 | A1 * | 10/2005 | Cheng et al. ................... 707/3 |

FOREIGN PATENT DOCUMENTS

| | | |
|---|---|---|
| WO | WO 99/03056 A1 | 1/1999 |

OTHER PUBLICATIONS

Web pages of www.lastminute.com, extracted from Internet on Feb. 17, 2000, pp. 1-32.

International Search Report for PCT/US05/31938, completed Oct. 10, 2006, mailed Jan. 9, 2007.

Written Opinion for PCT/US05/31938, completed Nov. 7, 2006, mailed Jan. 9, 2007.

"Zagat San Francisco/Bay Area Survey Published Millenium Edition," San Francisco; Oct. 8, 1999, extracted from http://www.zagat.com on Dec. 2, 2002.

Koranteng, Juliana, "Online Service Tells Surfers It's Never Too Late To Shop," *Advertising Age International*, Jan. 2000, p. 2.

Web pages from www.lastminute.com website, Oct. 13, 1999, extracted from www.archive.org on Nov. 19, 2002.

Web site materials, lastminute.com.

Web site materials, Travelocity.com.

Web site materials, 1travel.com.

Web site materials, 11thhourvacations.com.

Web site materials, cheaptickets.com.

Web site materials, concierge.com

Web site materials, expedia.com.

Web site materials, lowestfare.com.

Web site materials, previewtravel.com

Web site materials, searches for Sabre Inc. intellectual property.

Web site materials, sidewalk.com

Web site materials, skyauction.com

Web site materials, smarterliving.com.

Web site materials, soldout.com

Web site materials, ticketbroker.com.

Web site materials, ticketmaster.com.

Web site materials, tickets.com.

Web site materials, tkts.com.

Web site materials, priceline.com.

Web site materials, webflyer.com

Web site materials, lastminutetravel.com.

Listing of some travel related product and/or service providers active before the filing date of the subject application.

Lastminute.com 2000 Annual Report (Jan. 8, 2001).

* cited by examiner

Getaways

Home | FAQs | About Us | My Account | Help | Café 59 | Search: _____ go!

Welcome to *Site59 Getaways*, where making last-minute plans is a snap. Just choose from the *Getaways* options below and get ready for a great trip.

Day Trip
Take a day off and enjoy what's close to you. We'll show you where and how . . .

Short Weekend
Need a short break over the weekend? Check out our travel options . . .

Long Weekend
Did you let a long weekend creep up on you and leave you without plans? Let us help you out . . .

Vacation
There are always vacation options with Site59. Go ahead and procrastinate, but check out our great travel packages when you're ready to walk out the door . . .

---

*...Or Just Show Me*:
Flights | Hotels/B&Bs | Car Rentals

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

Sidebar - Site59 Navigation:
- Getaways
  - Daytrip
  - Short Weekend
  - Long Weekend
  - Vacation
- Around Town
  - Today
  - Tomorrow
  - This Weekend
  - Next 7 Days
- QuickGifts 25
- Red Carpet
- White Glove

Specials

Getaway With The King
Visit Memphis for Elvis Tribute Week . .

Click Here for Details

Big Easy Rhythm and Blues
Chill out on Bourbon Street in autumn sunlight and a champagne haze . . .
Click Here for Details

Hands on a Hard Body
Only in Texas . . .
Click Here for Details

Momentous Millennium
Anchor your private yacht on the Greenwich meridian as day dissolves into inky, starry night.

Exchange keepsakes with your loved ones as you watch the new millenuium come across the horizon . .

Click Here for Details

*Fig. 2B*

Getaways

Home | FAQs | About Us | My Account | Help | Café 59 | Search: [____] go!

Short Weekend

Choose your departure city: [New York ▼]

Click here if the city you are looking for is not listed.

Select the type of *short weekend* you're in the mood for (multiple selections possible) and click GO:

- ☐ Popular
- ☐ Romantic
- ☐ Rest & Relax
- ☐ Beach
- ☐ Impressive
- ☐ Culture
- ☐ Family
- ☐ Budget
- ☐ Wacky
- ☐ Party Hard
- ☐ Adventure
- ☐ Sporty
- ☐ Golf or Ski
- ☐ Single
- ☐ All Number of People: [Two Of Us ▼]

Number of Rooms Required: [Just One ▼]

[GO] [RESET]

...Or Just Show Me:
Flights | Hotels/B&Bs | Car Rentals

⚬ Back

Specials

Getaway With The King
Visit Memphis for Elvis Tribute Week..

Click Here for Details

Big Easy Rhythm and Blues
Chill out on Bourbon Street in autumn sunlight and a champagne haze...

Click Here for Details

Hands on a Hard Body
Only in Texas...
Click Here for Details

Momentous Millennium
Anchor your private yacht on the Greenwich meridian as day dissolves into inky, starry night.

Exchange keepsakes with your loved ones as you watch the new millenuium come across the horizon..

Click Here for Details

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2C*

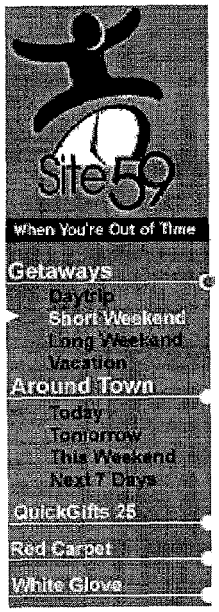

Getaways 

Home | FAQs | About Us | My Account | Help | Café 59 | Search: [____] GO!

Short Weekend

View by Price Per Person: Free | <$200 | $200-$500 | >$500 | All

You have selected: Romantic, Rest & Relax for two people. Click here to change your selection Displaying 10 – 12 of 12      ◀Prev | 1 | 2 | 3 | 4 | Next▶

| Date | Title | # of nights | Price per person | |
|---|---|---|---|---|
| 8/16 - 8/18 | *Remember the King* <br> Visit Memphis for Elvis Tribute Week <br> Memphis, TN | 2 | $399 | BUY IT |
| 8/16 - 8/18 | *Manhattan Landing* <br> Fly in a helicopter around the greatest island on Earth. <br> New York, NY | 2 | $699 | BUY IT |
| 8/16 - 8/18 | *Massage & Meditation at Canyon Ranch* <br> Tuscon, AZ | 2 | $499 | BUY IT |
| 8/16 - 8/18 | *Art & Pampering* <br> Washington, DC | 2 | $399 | BUY IT |
| 8/16 - 8/18 | *Indians, Twins, and Rock & Roll* <br> Cleveland, OH | 2 | $399 | BUY IT |
| 8/16 - 8/18 | *Tax-Free Shop 'Till You Drop* <br> Boston, MA | 2 | $299 | BUY IT |
| 8/16 - 8/18 | *Afternoon Tea and Symphony* <br> Boston, MA | 2 | $299 | BUY IT |

*Click on column headings to sort.*

**...*Or Just Show Me*:**
Flights | Hotels/B&Bs | Car Rentals

◯ *Back*

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2D*

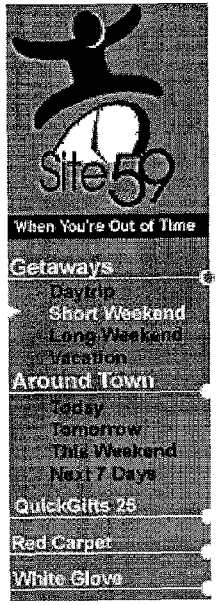

Getaways 

Home | FAQs | About Us | My Account | Help | Café 59 | Search:

Remember the King: Memphis, TN

You must experience Elvis!

There is nothing quite like the Saturday-night candlelit vigil at Graceland during Elvis Tribute Week. Graceland, Elvis' home for 20 years, is a must-see part of Americana. To fully understand the Elvis experience, attend the Elvis impersonator show. Also included in this package are impossible-to-get dinner reservations at Memphis's finest restaurant, Chez Phillippe. Stay at the hip Adams Mark Hotel, where Bruce Willis is often a guest. For brunch, try southern fried lobster at Betsy's.

Price:
$399 per person

Date:
8/16/99 - 8/18/99, click here to see alternative dates

Package details:
- Roundtrip flight leaving New York (LaGuardia) 8/15 at 7:00 am returning from Memphis 8/17 at 11:42 am
- Reservations at the Adams Mark Hotel for two nights
- Car rental for two days
- Dinner reservations at Chez Phillippe for 8/17 at 9:00 pm
- Tickets to the Elvis Impersonator Show, 8/17 at 6:00 pm
- No upgrade selected

*Site 59 will provide you with a complete itinerary and package details after your order has been confirmed.*

Buy it | Upgrades | Reviews | Pictures | Weather | Map

---

◯ Back

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

Fig. 2E

Getaways

Home | FAQs | About Us | My Account | Help | Café 59 | Search: [____] GO!

Selection Confirmation

*Please review your order below and then continue the checkout process*

| | |
|---|---|
| Item: | _Remember The King_ <br> Memphis, TN |
| Date: | 8/16/99--8/18/99 |

Number of Persons: 2

| | |
|---|---:|
| Unit Price (per person): | $399.00 |
| Subtotal: | $798.00 |
| Upgrade | $49.00 |
| Promotion: <br> Enter promotional code here: [____] | $0.00 |
| Fees & Taxes | $21.00 |
| TOTAL: RECALCULATE | $868.00 |

*Sign in here to proceed with purchase*

| | |
|---|---|
| User Name: | [____] |
| Password: | [____] |

CONTINUE CHECKOUT

Forgot your password? Click here
<Invalid login>
If you are not Jane Doe, please enter your correct username and password above. If you are not a member you must first register; it's fast and it's *free*!

---

⬅ *Back*

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2F*

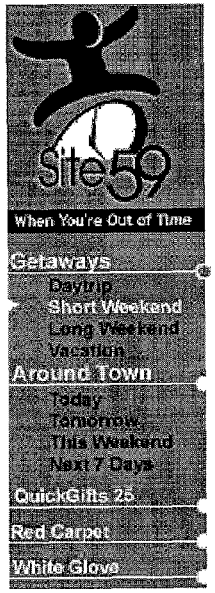

Getaways 

Home | FAQs | About Us | My Account | Help | Café 59 | Search: [____] GO!

Check Out

We currently have the following information about your account.

Billing Address: Delivery Address:
Ms. Jane Doe              Ms. Jane Doe
123 Main Street           123 Main Street
Smalltown, MI 12345       Smalltown, MI 12345
                          (Edit Delivery Address)

Email Address:        jdoe@hotmail.com
Payment Method:       VISA **--**-1234

My Travel Companions:
Chris Moeller
Lars Schernikau

If you would like to change or update your Travel Companion information, click here.
If you would like to change or update your account information, click here.

| Item: | Remember The King: *You must experience Elvis!* Memphis TN. |
|---|---|
| Date: | 8/16/99-8/18/99 |
| # of Persons: | 2 |
| Unit Price (per person): | $399.00 |
| Subtotal: | $798.00 |
| Upgrade: | $49.00 |
| Promotional Discount: | $35.00 |
| Fees & Taxes: | $21.00 |
| TOTAL: | $833.00 |

SUBMIT

Back

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2G*

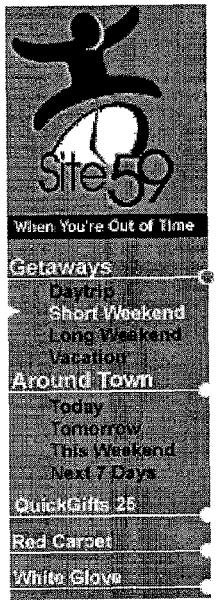

Getaways 

Home | FAQs | About Us | My Account | Help | Café 59 | Search: _____ |GO!

Order Confirmation

Thank you for shopping with *Site59*, Jane Doe.

Confirmation: Your Order Confirmation Number is *341256*. We have just sent an initial order confirmation email to your email address. You will receive a second email once your purchase has been verified and finalized.

Itinerary: To view or print the complete details of your order, click here. Please note that your confirmation email will include complete details of your purchase.

Loyalty Programs: You have received a total of 500 loyalty points. To view your total point accumulation or learn more about the Loyalty System click here.

Reviews: *Site59* gets better with more users reviewing their experiences. Please be sure to let us know how you enjoyed your *Site59 Getaways* purchase by visiting the Reviews section after your trip and giving a *Getaways Review* to receive more Loyalty Points.

You may also be interested in . . .
Your Full Itinerary
Your Memphis City Cheatsheet
Your Memphis City Map
Around Town In Memphis
Red Carpet Auctions in Memphis
Five day weather report for the Memphis area To continue browsing *Getaways* Click Here
To return to the *Site59* homepage Click Here

---

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2H*

Getaways

Home | FAQs | About Us | My Account | Help | Café 59 | Search: [____] go!

Remember the King:  Your Full Itinerary

---

Remember the King: You Must Experience Elvis!

You'll feel the King's hometown during this two-day, two night stay at the charming Adams Mark Hotel. You'll appreciate southern tastes at Chez Phillippe, and will swear you saw Elvis at the Elvis Impersonator Show.

Flights: 2 roundtrip tickets, Coach Class

*Outbound:* Delta Flight 573
From: LAG-NY 11/15/99  Dep: 7:00am
To: Atlanta, GA  Arr: 9:38am Delta Flight 585
From: Atlanta, GA  Dep: 10:40am
To: Memphis, TN  Arr: 10:59am
Meal: None

*Inbound:* Delta Flight 868
From: Memphis, TN 11/17/99  Dep: 6:30am
To: Atlanta, GA  Arr: 8:47am Delta Flight 508
From: Atlanta, GA 11/17/99  Dep: 9:30am
To: LAG-NY  Arr: 11:42am

Car Rental: Standard Package, Intermediate-Sized Car
Pick-up, Memphis Airport, 11/15/99
Return, Memphis Airport 11/17/99
Telephone: (510) 555-5555

Hotel: Adams Mark Hotel
2 nights: 11/15 - 11/17
Standard Double
Telephone: (510) 555-5555

Restaurant: Chez Phillippe
Reservations for two, 11/16/99 at 9:00pm
Formal, jacket required
Telephone: (510) 555-5555

Event: The Elvis Impersonator Show
Tickets for two, 11/15/99, 8:00pm
The Imperial Theatre
Telephone: (510) 555-5555

---

*Back*  Questions or Comments?
Email us at comments@site59.com
Home | Getaways | Around Town | QuickGifts 25
Red Carpet | White Glove | Café 59 | Reviews | Lottery
© 1999 Site59. All rights reserved.
Terms of Service | Privacy

*Fig. 21*

Around Town

Home | FAQs | About Us | My Account | Help | Search: [    ]

Welcome to Site59 *Around Town*, where making last-minute plans is a snap. Just choose from the four options below and get ready for some fun in the city today.

Today
  This is really last minute, but no problem, we've got something, even for you . . .

Tomorrow
  Tomorrow is not far off . . . don't wait any longer. Get some great ideas right here . . .

This Weekend
  Want to make this weekend something special? Let us help you . . .

Next 7 Days
  Got some time left over during the next week? At Site59 we'll always have the right thing just for you . .

⬅ Back

Specials

Candlelight Dinner Catered candlelight dinner in your apartment . . .
Click Here for Details

NY Double Whammy Impossible-to-get dinner reservations at Union Square Cafe and Lion King tickets . . .
Click Here for Details

Evening Of Romance Couples massages and basket of romance essentials at your apartment . . .
Click Here for Details Questions or Comments?
Email us at comments@site59.com Home | Getaways | Around Town | QuickGifts 25
Red Carpet | White Glove | Café 59 | Reviews | Lottery © 1999 Site59. All rights reserved.
Terms of Service | Privacy

*Fig. 2K*

QuickGifts 25

Home | FAQs | About Us | My Account | Help | Café 59 | Search: [____] GO!

Instant gifts, greetings, and appreciation
Select the occasion:

*Personal*  *Business*  *Spoil Yourself*

| Romantic | Good Job / Thanks | Chocoholic |
| Congratulations | Congratulations | Top 10 Stuff |
| Birthday | Birthday | Toys and Gadgets |
| Cheer Up / Get Well | Get Well Soon | Comfort Food |
| Baby | Baby | Guys and Gals Essentials |
| Kids | Wedding | Spice It Up |
| Apology | | |

*...Or Just Show Me:*
Flowers | Gift Certificates | Edibles | Cards

Sidebar:
- Getaways
  - Daytrip
  - Short Weekend
  - Long Weekend
  - Vacation
- Around Town
  - Today
  - Tomorrow
  - This Weekend
  - Next 7 Days
- QuickGifts 25
- Red Carpet
- White Glove Questions or Comments?
Email us at comments@site59.com Home | Getaways | Around Town | QuickGifts 25
Red Carpet | White Glove | Café 59 | Reviews | Lottery © 1999 Site59. All rights reserved.
Terms of Service | Privacy

*Fig. 2L*

*QuickGifts 25* 

Home | FAQs | About Us | My Account | Help | Café 59 | Search: [____] GO!

Gift Selections/Birthday

View only Free | <$25 | $25 to $50 | $50 to $100 | >$100

Select a Birthday gift from the list below:

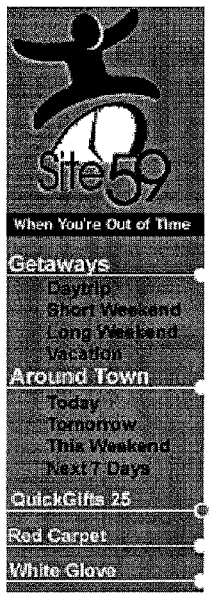

| Item | Price | | |
|---|---|---|---|
| Wine & Cheese Basket | $50 | BUY IT | View Picture |
| An Hour Of Pampering | $50 | BUY IT | View Picture |
| Picnic To Go | $50 | BUY IT | View Picture |
| Off-Broadway Tickets | $50 | BUY IT | View Picture |
| Tasty Treats | $25 | BUY IT | View Picture |
| A Dozen Roses | $25 | BUY IT | View Picture |
| Golfer's Delights | $25 | BUY IT | View Picture |
| Outdoor Adventure Gift Certificate | $25 | BUY IT | View Picture |
| Movie Magic | $25 | BUY IT | View Picture |

*Click on headings to resort table*

...Or Just Show Me:
Flowers | Gift Certificates | Edibles | Cards

◯ *Back*

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2M*

Red Carpet

Home | FAQs | About Us | My Account | Help | Café 59 | Search: [____] GO!

Hard-to-get items available on auction:

Air Tickets

Hotel Rooms

Car Rentals

Restaurant Reservations

Event Tickets
(sports, shows, concerts)

Interested in posting an item on Site59 Auctions? Contact us at auctions@site59.com or click here to begin.

Featured Auctions

R.T. Coach Flight:
New York - London
8/26/99 — 8/28/99
Current bid: $1,050

Chez Phillipe
Memphis, TN
Restaurant reservation
8/26/99
Current bid: $20

Adams Mark Hotel
Memphis, TN
2 nights,
double occupancy
8/26/99 — 8/28/99
Current bid: $630

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2N*

Red Carpet

Home | FAQs | About Us | My Account | Help | Café 59 | Search: _____ |GO!

Place A Bid

You have selected the following item to bid on:

| Adams Mark Hotel | | Quantity available: | 1 |
|---|---|---|---|
| 8/26/99 - 8/28/99 | | Initial bid: | $500.00 |
| Auction ends: | 8/25/99 – 9:12 pm | Current bid: | $625.00 |
| Time left: | 3days 5h 27m | Bid increment: | $25.00 |

For Bid History click here.

I Must Have This Now!
You can! There is a price at which you win the auction immediately. Click here for details.

| Your Bid: | _____ | Current minimum bid is $625 |
|---|---|---|
| Your Quantity: | _____ | Currently available: 1 |

Your bid is a contract
Only place a bid if you're serious about buying the item; if you're the winning bidder, you will enter into a legally binding contract to purchase the item from the seller. Remember to type in numbers only and use a decimal point (.) when necessary.
Don't include a currency symbol ($) or thousand separator. For example: 1000000.00
Choose your bid carefully, though, as you won't be able to reduce it later.
<Invalid login>
To finalize your bid, enter your User ID and Password and click GO.

| Username: | _____ | |
|---|---|---|
| Password: | _____ | BID |

Forget your password? Click Here

Registration Required, it's fast and it's free!

---

*Back*   Questions or Comments?
Email us at comments@site59.com
Home | Getaways | Around Town | QuickGifts 25
Red Carpet | White Glove | Café 59 | Reviews | Lottery
© 1999 Site59. All rights reserved.
Terms of Service | Privacy

*Fig. 2P*

White Glove

Home | FAQs | About Us | My Account | Help | Café 59 | Search: [____] go

Find Your Best Local Source for Last-Minute Services

Select your city: New York [▼]  If the city you are looking for is not listed, Click here

---

Baby, House, and Pet Sitting

Beauty & Pampering

Party Planning

Business Services

Car Services

Concierge & Unusual Requests

Household Help

Click here for a Complete Category Listing
Service providers click here if you are interested in posting your service or to edit your current posting.

---

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2Q*

Lottery

Home | FAQs | About Us | My Account | Help | Café 59 | Search: [____] GO!

Welcome to the Site59 Lottery

*Site59* Lottery is our way of thanking our loyal customers. Each month, *Site59* will automatically qualify 100 of its customers to enter the *Site59* Lottery. Click here to read how it all works.

Our prize for the December Lottery has not yet been claimed!!

| | |
|---|---|
| Current Prize: | Candlelight Dinner for Two |
| Current Winner: | Scherni |
| Time Left To Claim Prize: | 1day 15h 13m |

If you are Scherni then click below to claim your prize!
CLAIM PRIZE

If you didn't win this month, perhaps you will next month. Follow the links below for more information...
Am I qualified for the Site59 Lottery?
Am I currently a potential winner?

| Past *Site59* Lottery Winners | | | | |
|---|---|---|---|---|
| November | Megaman | won | Remember the King | Read reviews |
| October | Loudergirl | won | New York Double Whammy | Read reviews |
| September | Glotzenkot | won | Art and Pampering | Read reviews |

◯ *Back*

Questions or Comments?
Email us at comments@site59.com

Home | Getaways | Around Town | QuickGifts 25
Red Carpet | White Glove | Café 59 | Reviews | Lottery © 1999 Site59. All rights reserved.
Terms of Service | Privacy

*Fig. 2R*

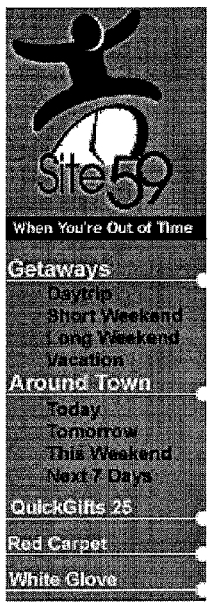

My Account

Home | FAQs | About Us | My Account | Help | Café 59 | Search: [____] GO! 

My Account

| Edit My Info | Change My Password | Change My Preferences | Change My Gift Reminders |

Lars Schernikau (sherni)  [EDIT]
sherni@iname.com
Current Loyalty Points: 275          Contact loyalty@site59.com to redeem points

My Dream Getaways  [EDIT]
Dune Buggies in Arizona
Remember the King
New York Double Whammy

My Past 3 Purchases          Click here for full List
Hang Gliding in Sonoma          Write a Review
Candlelight Dinner               Write a Review
Climbing Mt. Rainier             Write a Review

My Next 3 Gift Reminders  [EDIT]
Mrs. Micha Schernikau, December 3, 1999, 1 day notice
Julie, wedding, December 4, 1999, 1 day notice
Dad, anniversary, December 12, 1999, 1 day notice

My Message Boards  [EDIT]
International travel over the holidays (2 new messages)   Unsubscribe
Is the Y2K going to be a problem?                            Unsubscribe
Travels Tips (3 new messages)                            Unsubscribe
Virtual Lounge                                               Unsubscribe ⊙ Back Questions or Comments?
Email us at comments@site59.com Home | Getaways | Around Town | QuickGifts 25
Red Carpet | White Glove | Café 59 | Reviews | Lottery © 1999 Site59. All rights reserved.
Terms of Service | Privacy

*Fig. 2S*

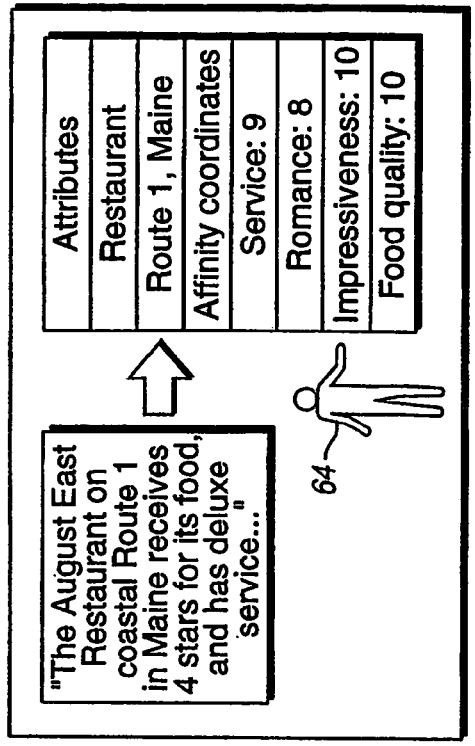
Fig. 4B
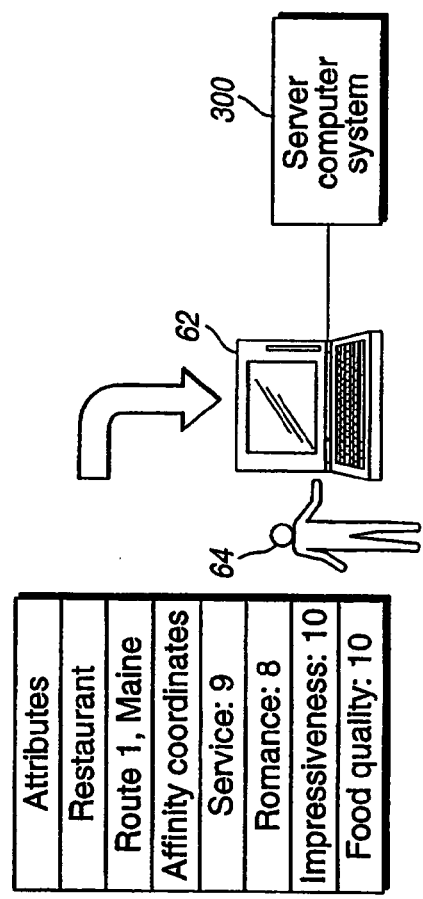
Fig. 4A
Fig. 4C

2. Set's up system with possible offering information

4. Puts offerings on queue for approval

1. Local content manager defines a package template

3. Select offerings of interest

1. Regional Director looks at offerings in Queue

2. Changes default margins and add coupons, rebate

3. Authorizes (approves) Posting of Offerings

2. Customer describes preferences which can be represented as coordinates in the affinity space. The system returns a set of offerings that are within the space delimited by those requirements.

1. Customer describes requirements

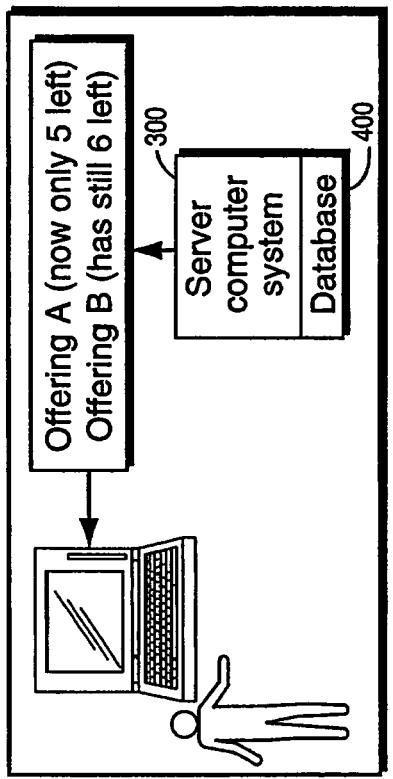

1. Order is executed either automatically or with Operator help

*Fig. 11A*

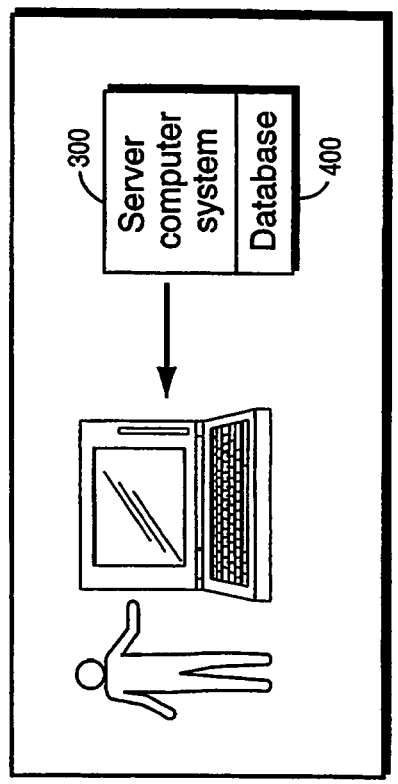

2. System automatically decreases the number of available package offerings by the amount sold.

*Fig. 11B*

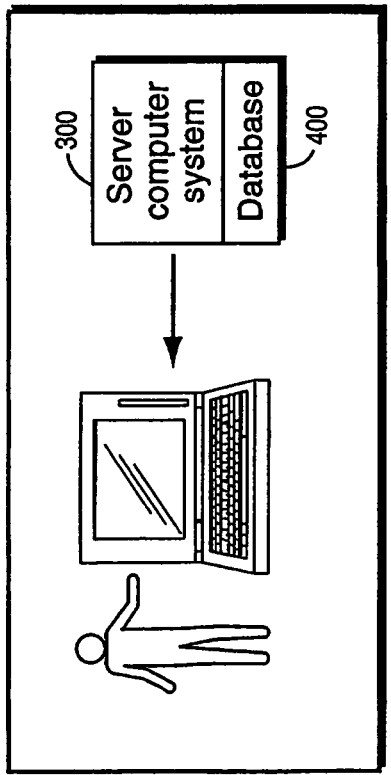

3. Confirmation is sent to the Customer along with relevant reservation information

*Fig. 11C*

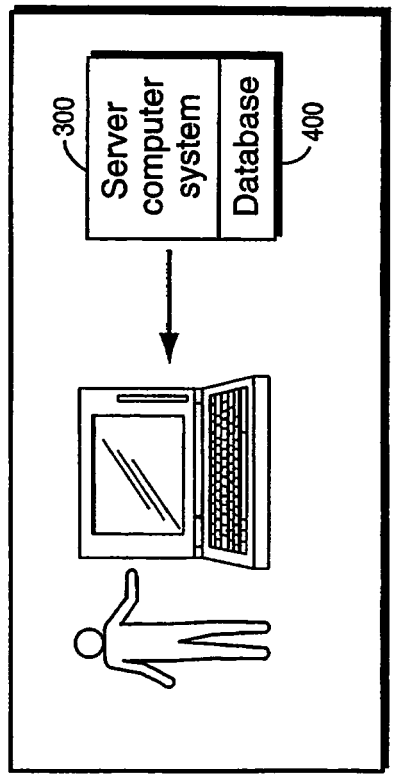

4. Relevant information is stored for algorithm optimization or other requirements (reporting, statistical information, etc.)

*Fig. 11D*

Find a Last-Minute Deal

From: New York City

To: Florida

Boca Raton

Depart: Friday, Sep 03

Return: Sunday, Sep 05

Sunday, Sep 05
Monday, Sep 06
Tuesday, Sep 07
Wednesday Sep 08

Fig. 21

Search Results

See packages from New York City below, or start a new search.
Package prices are based on double occupancy and include all taxes & fees.

Flight + Hotel (optional cars available)

Your Search Results

| Destination | Dates | Price per Person |
|---|---|---|
| Boca Raton, FL (Flights into West Palm Beach) | Fri, Sep, 3 - Sun, Sep, 5 | Choose $295 |

Alternate Dates

| Destination | Dates | Price Per Person |
|---|---|---|
| Boca Raton, FL | Thu, Sep. 2 - Sun, Sep. 5 | from $339 |
| Boca Raton, FL | Fri, Sep, 3 - Mon, Sep 6 | from $381 |
| Boca Raton, FL | Sat, Sep. 4 - Mon, Sep 6 | from $339 |

See all available dates from $295

Nearby Destinations (flights into West Palm Beach)

| Destination | Dates | Price Per Person |
|---|---|---|
| West Palm Beach, FL | Fri, Sep, 3 - Sun, Sep, 5 | from $295 |
| Vero Beach/Port St. Lucie, FL | Fri, Sep, 3 - Sun, Sep, 5 | from $320 |
| West Palm Beach, FL (includes luxury hotel) | Fri, Sep, 3 - Sun, Sep, 5 | from $322 |

Other Destinations in the Florida

| Destination | Dates | Price Per Person |
|---|---|---|
| Golden Isles, FL | Fri, Sep, 3 - Sun, Sep, 5 | from $260 |
| Miami, FL | Fri, Sep, 3 - Sun, Sep, 5 | from $277 |
| Jacksonville, FL | Fri, Sep, 3 - Sun, Sep, 5 | from $291 |
| Fort Lauderdale, FL | Fri, Sep, 3 - Sun, Sep, 5 | from $302 |
| Miami Beach, FL | Fri, Sep, 3 - Sun, Sep, 5 | from $303 |
| Naples/Gulf Coast, FL | Fri, Sep, 3 - Sun, Sep, 5 | from $318 |

Other Beach Destinations

| Destination | Dates | Price Per Person |
|---|---|---|
| Miami Beach | Fri, Sep, 3 - Sun, Sep, 5 | from $303 |
| St. Petersburg/Clearwater | Fri, Sep, 3 - Sun, Sep, 5 | from $342 |
| Florida Keys | Fri, Sep, 3 - Sun, Sep, 5 | from $345 |
| Cancun, Mexico | Fri, Sep, 3 - Sun, Sep, 5 | from $422 |

Boca Raton: Why Go

Boca Raton, FL (via Palm Beach): Champagne Wishes
From champagne wishes to caviar dreams, Palm Beach's cousin city offers only the finest of what life has in store--but, of course.

It's what dreams are made of, caviar dreams that is--a place where palm-lined drives lead to mansion-lined marinas, which lead to yacht-lined docks. Developed in the 1920s as a beach getaway for American royalty, Boca Raton maintains the glamour of a grand era, when grandiose Spanish-style mansions were in fashion, and Scott and Zelda Fitzgerald appeared on the scene as regulars.

Today, Boca welcomes an equally jet-set crowd. Join the crowd this weekend to indulge in haute cuisine, upscale boutique browsing, and lounging on the beach. Linger through Old Floresta, a 1920s neighborhood of Mediterranean-style homes with grand open balconies, decorative wrought-iron gates, and impeccable landscaping.

Surrounded by such beauty, one might think that Boca's striking aesthetic is only skin-deep--not so! Break from the afternoon heat with a retreat to dazzling collections at the The Boca Raton Museum of Art, featuring a fine selection of late 19th and 20th-century paintings and sculptures, and the Norton Gallery, with an extraordinary Old Master's collection including Bosch, Matisse and Renoir.

Search keywords: Beach, Cupid

Editor's Boca Raton Picks

*Based upon comparison with published rates for air & hotel reservations booked within 7 days of departure.

About Site59 | Press | Customer Service | Corporate Programs | Travel Agents | Privacy Policy | Terms of Service
Copyright 2004, Site59.com, LLC. CST 2066904-50

Fig. 22

SYSTEM, METHODS AND COMPUTER PROGRAM PRODUCTS FOR OFFERING PRODUCTS BASED ON EXTRAPOLATION OF INPUTS

CROSS-REFERENCE TO RELATED APPLICATIONS

This application is a continuation-in-part of U.S. patent application Ser. No. 09/516,252, filed on Mar. 1, 2000 now U.S. Pat. No. 7,092,892, which is hereby incorporated herein in its entirety by reference. This application also claims priority to, and incorporates in its entirety by reference, U.S. Patent Application Ser. No. 60/607,643 filed on Sep. 7, 2004 and entitled "System, Methods and Computer Program Products for Offering Products Based on Extrapolation of Inputs."

BACKGROUND OF THE INVENTION

1. Field of the Invention

This invention relates to data automation techniques for automatically assembling packages of items, and more particularly, to affinity algorithms for grouping products or services. Still more particularly, the invention relates to web-based techniques for dynamically assembling items including, but not limited to, last-minute travel and entertainment packages for purchase by consumers.

2. Description of Related Art

1. Consumer Demand Exists for Last-Minute Travel Services . . .

In today's ever-changing, hectic world, consumers are increasingly forced to make plans at the last minute or alternatively to not make any plans at all. With the increased penetration of technology into today's society, people are on-call and reachable 24 hours a day, seven days a week. The high penetration of technology has also increased the geographic reach of today's corporations. As the business world reaches beyond national borders, workdays have been extended to accommodate different time zones and cultural styles. Globalization also suggests more and longer business trips as companies grow and interact on a global basis.

Increased competition among the world's various corporations has led to the need for longer workdays. As a result of these trends, the average also an increased need to maximize the reduced leisure time available.

Furthermore, there is a trend toward more dual income households, increasing to 61% in 1993 from only 39% in 1970. With this shift, there are fewer spouses at home with the luxury to spend serious amounts of time planning a family's leisure life.

For consumers, increasingly hectic lifestyles and longer work hours lead to less time for planning leisure activities and create a greater desire to enjoy the limited time available. This often translates into spur-of-themoment vacation travel planning. There is a demonstrated need to help the consumer plan immediate and last-minute travel.

2. . . . But Current Offerings are Insufficient.

Modem telecommunications services have transformed the travel industry by providing consumers instant access to airline, hotel, and rental car reservation services. It is now possible to purchase last-minute airline tickets. and to make rental car and hotel reservations by visiting airline, rental car, hotel, and general travel websites on the World Wide Web. However it continues to be a daunting proposition to arrange travel at the last minute using these sites. First, the consumer typically needs to do substantial up-front planning—deciding where to go and what to do—before using these services. Next, the consumer usually needs to visit several unrelated sites in order to arrange a basic travel experience, including air, hotel, and car rental reservations. Finally, even after securing these basic reservations, the consumer is left with no specific plans—where to eat, what shows to see, what to buy—once he or she arrives at the destination city. Making these destination-specific plans requires additional up-front planning; securing the reservations usually requires a series of phone calls.

3. Suppliers have Demonstrated Need to Sell Last-Minute Inventory . . .

Suppliers of travel related services (e.g., hotels, airline tickets, restaurants, etc.) also have a great need to offer last-minute travel arrangements to consumers. The total travel industry has been growing at an annual rate of in excess of 5% over the past decade. Partly underlying this increase is growth in weekend, leisure getaways. According to the Travel Industry Association of America, weekend trips by Americans increased 70% from 1986 to 1996 (from 350 million trips in 1986 to over 600 million in 1996) versus a population growth of only 10% over the same period. Non-weekend trips increased 15% in the same timeframe. Two-day getaways now account for more than half of US travel. Overall vacations also continue to grow in popularity—increasing from 945 million people trips in the US in 1997 to 1.3 billion people trips in 1998.

Despite this growth, approximately $84 billion of travel service provider capacity expires unused each year in the high-fixed cost airline, hotel and entertainment industries due to unsold tickets/rooms in the U.S. alone. Airlines continue to lose out on major amounts of revenue by letting airline seats go unsold. With load factors averaging near 71% in 1999 for major carriers, airlines leave approximately 220 million airline seats on the table every year. At an average one-way ticket price of $141, this implies lost revenues of near $31 billion in 1998. Similarly, with occupancy rates hovering in the low-60s in 1998/99, hotels have an unsold capacity of near 560 million room-nights per year. At an average room night of $81 for unsold rooms, hotels lost out on near $46 billion of revenue in 1998/1999. Entertainment venues also often do not sell out. Approximately 195 million tickets go unsold per year, assuming a load factor of 73%. At an average ticket price of $33, the entertainment industry experience an annual S7 billion in lost revenue.

Combining the airline, hotel and entertainment categories leads to a total lost opportunity to suppliers of nearly $84 billion each year in the U.S. alone. Furthermore, as these categories have insignificant variable costs, most of these lost revenues would have trickled down to the bottom line. Tapping into this otherwise perishing inventory offers a huge opportunity to increase efficiency, reduce waste and increase profits.

4. . . . But Current Channels are Inadequate

In choosing where to try to market their excess inventory, suppliers generally seek two major capabilities from a third party: 1) The third party's ability to sell difficult inventory that the supplier has not been able to move through their traditional channels, and 2) the third party's ability to move this inventory without making discounts transparent to consumers, and therefore to protect the supplier's base business against cannibalization.

Third parties can satisfy both supplier demands by bundling separate components from different suppliers into packages. Individual pieces of undesirable inventory can become attractive, and more "saleable," when intelligently assembled together as a package. By packaging inventory 15 third parties can also offer a single package price which hides the price of each component, preventing the erosion or cannibalization of a supplier's base business.

Of course, the concept of offering combinations of various travel related services as a package is nothing new. For many years, travel agents have been putting together customized vacation packages for their clients, and travel discounters have been marketing prepaid vacations including transportation, hotel accommodations, and restaurant arrangements collected from different suppliers. Today travel agents offer vacation packages over the World Wide Web, with booking and purchasing accomplished online. Making travel arrangements in this fashion is convenient, quick, and efficient.

However, these packages-whether sold over the phone or on the web-generally fall to incorporate much last-minute, truly distressed inventory: today's third-party travel service providers simply do not have the capabilities to unleash demand for last-minute travel. Putting packages together quickly is extremely difficult and time-consuming due to the enormous number of permutations that exist when one combines available flights with available hotels and available events. Providing highly customized, mood-based packages to consumers adds yet another level of complexity to package creation. And suppliers make it even harder for packagers because they are often unwilling to make inventory available as "distressed" until they are sure they will not be able to sell it through existing channels.

Packaging non-distressed, non last-minute inventory provides only partial value to consumers: they receive the convenience of a pre-packaged getaway without any level of individual or mood-based customization and without taking advantage of the low prices offered on truly last-minute inventory. For suppliers, packaging provides an acceptable conceptual solution to marketing their truly last-minute, distressed inventory, but not an effective or a practical one. And unpackaged channels remain undesirable to suppliers because they fall to protect their base businesses from price erosion or cannibalization.

It would be highly desirable to find a solution both to consumers' appetite for fully-packaged last-minute travel and to suppliers' desire to move their unsold, perishing inventory without impairing the viability of their base businesses. Due to the widespread advances in communication capabilities, to effectively market close-to-expiring travel inventory in real time directly to consumers. Because the packaging of perishable, last-minute inventory is so time-sensitive, there is substantial need to put packages together quickly and efficiently. The required solution must provide an automatic system and improved method capable of receiving and categorizing inventory and putting together packages on a real-time, dynamic basis.

5. Present Invention Solves Last-Minute Travel Problems of Both Consumers and Suppliers When offering items for sale through a computer system, for example on a Web site, it is useful at times to group the items together into a package. Such a capability is particularly advantageous in connection with last-minute travel offerings, but could have other applications as well. Examples might include but are not limited to: products such as components of a stereo system or a selection of diverse yet related gifts; products and services together, as with appliances, carpentry, painting, flooring replacement, and cabinetmaking for a kitchen renovation; or bundles of services, such as legal services, real estate brokerage, and mortgage brokerage for a house sale.

If the business or businesses offering the items for sale offer many items that may potentially be grouped into packages, with substitutable elements, the problem of finding appropriate elements to group into packages and thus appropriate packages to offer for sale can be difficult to solve. Some elements may be good matches for each other—for example, in a stereo component system a powerful amplifier might be better paired with large speakers than small speakers—and others less so.

BRIEF SUMMARY OF THE INVENTION

The present invention solves these problems by providing a method of structuring the work of building packages, and an algorithm for generating desirable packages for sale. In more detail, the present invention provides a system and method for grouping and selling products or services using a computer system, potentially connected to a network such as the decentralized network of the Internet. The computer system includes a computer with multiple terminals, potentially instantiated as a server computer or computers, and distributed client computers. The computer system presents a sales interface on some terminals showing products or services and groups of products and/or services that are for sale. The computer system presents a back end interface on some terminals, which can be used to enter new products, services and groupings of products and/or services to be offered for sale on the sales interface.

Descriptions of the products or service offerings are entered into the computer system either by data entry operators using the back end interface or by a program reading product or service descriptions from external computer systems. The method groups these products or services according to an affinity algorithm. The groupings may then potentially be reviewed and approved or selected by human operators using the back end interface before being offered for sale on the sales interface.

For example, the present invention can provide method of offering items for sale in a group, comprising:
  defining an affinity space coordinate for each of a plurality of items available for sale;
  creating a package template including at least one mandatory element schema having an associated affinity space description;
  comparing, with a computer, the affinity space coordinate for each of the plural items with the affinity space description associated with the package template; and
  if the comparison step reveals a match, presenting for sale a package that is defined at least in part by the package template and includes at least one item with a matching affinity space description.

An advantageous implementation provided by the invention is a computer system for offering travel arrangements over a decentralized computer network to a consumer using a web-browsing appliance. The computer system includes a data storage arrangement that stores descriptions of available travel components and at least one travel package template. A user interface element coupled to the network elicits at least one constraint from a consumer. A package engine dynamically generates at least one travel package based on the elicited consumer constraint, at least one travel package template, and at least one stored available travel component description. The package engine offers the generated travel package to the consumer by transmitting a description of the generated travel package over the decentralized computer network to the consumer's web browsing appliance.

Such a particularly advantageous example embodiment of invention may provide the following processes.

Item entry;

Package schema entry;

An affinity algorithm used to group items into packages;

A package selection process to select packages to be presented; and

Sales and purchase.

In one particularly advantageous example, the affinity algorithm and associated supporting steps enables consumers to arrange their last-minute travel and entertainment plans, providing the following characteristics:

Value;

Convenience—including a last-minute lens, bundling, display of what is available, and reviews and other information;

Personalization—including a searching by mood, or people type;

Breadth—covering all "fun" categories and all suppliers;

Availability and fulfillment—including showing only what is available, the ability to fulfill, same-day fulfillment, and online processing;

Quality—including screening the products offered and offering premium products.

Additional advantageous features and/or advantages provided by an example embodiment of the invention include.

A last minute entry point is provided for consumers planning travel and entertainment activities.

A finite list of tailored options (rather than an exhaustive listing) is presented in a rolling seven-day window.

Activities can be organized and packaged by "mood occasion" (e.g., Romantic or Adventurous) rather than by event (e.g., Yankees game) or destination (e.g., trip to London).

A scalable, database-backed system automatically receives and processes distressed inventory updates from suppliers and screens available components to generate potential offers for consumers—facilitating the creation of a large volume of creative, unique offers without requiring a large number of people.

A database that initially includes information on leisure options in sixty destination spots across North America, Europe and the rest of the world. These options might range, for example, from art museums to yearly festivals and events to hang-gliding expeditions.

Appropriate descriptors (data schema) for these options facilitate their inclusion in the database. For example, each option can be categorized in several ways—such as type (e.g., adventurous, romantic, etc.); suitability (e.g., kids, couples, group of friends, etc.); availability (e.g., seasonality, days of the'vveek, etc.); time required to complete; distance from city center; prices; quality ratings; etc.

System asks the consumer for input on types of experiences desired (e.g., adventurous, romantic, wacky, etc.).

System provides ideas and makes suggestions to the consumer.

System dynamically creates original content based on database contents.

System checks availability before displaying an option to a consumer to provide a form of guaranteed availability.

System provides value via intelligent truncation.

System provides a one-stop, complete solution including fulfillment.

System includes value-added and community aspects as an integral part.

System provides value by allowing customers to post reviews of packages purchased and view reviews of packages being considered.

System provides value by allowing customers to upgrade or alter individual items within a package (for example, change from standard room to a suite, or change flight departure from afternoon to evening.)

System provides value-added information particular to each package offered such as weather conditions, local maps, and recommendations for additional dining and entertainment options.

System creates a psychological entry point for consumers. Traditional commerce is organized around WHAT, and WHERE: "I want to buy an airline ticket," or "I'm going to the department store." However, system enables business to offer psychological entry points-better for both consumers and suppliers-that are organized around WHEN: "I need a plan for tomorrow."

In another embodiment, the present invention includes a computer system that is configured to extrapolate from a relatively small amount of consumer supplied information and provide a range of travel options with minimal effort by the consumer. For example, the computer system can have a process configured to record at least one of a desired travel date and a desired destination entered by the consumer and additional processes for returning extrapolative results including any one of an alternate date generation process, a nearby destination process, a regional destination process and a theme destination process.

The alternate date generation process is configured to relax the date constraints entered by the user, such as by adding days to the requested departure and return dates to those requested by the consumer and using the dates to find or create other packages going to the same destination. As an alternative example, the alternate date generation process may search forward and backwards of the requested dates for other weekends, holidays or similarly themed dates if the requested dates fall on a weekend.

The nearby destination generation process is configured to find other destinations that are sufficiently near to the airport of the consumer requested destination to be convenient or practical alternative travel options. For example, the nearby destination generation process may be configured to determine distances from the airport to the other destinations that are not in the same city as the destination requested, but fall within a predetermined radius, such as 100 miles. Other criteria may be used to determine what qualifies as "nearby," including finding destinations that are accessible from the same airport as the consumer selected destination with relatively low cost or minimal hassle (such as a direct train ride).

The regional destination process is configured to determine which region the consumer selected destination falls within, such as by extracting data on the selected state of the destination or by comparing the destination to predetermined, stored regions, such as the Southwest or the Caribbean. Further, the regional destination process can be configured to search and find, or construct, other packages that are within the same region (e.g., within the same state) for consideration by the consumer.

The theme destination process is configured to sense or extract a theme from the limited information entered by the consumer. For example, the theme destination process can extract from one, or both, of the consumer selected destination (e.g., Florida) and date (e.g., Spring break) that the consumer is interested in traveling to other beaches. The theme destination process is configured to use this information to construct, or search for, other packages having the same theme (e.g., other beach destinations such as Cancun, Mexico).

Themes can be extracted from the consumer selections in several ways, such as by generating or finding a package that is an exact match to the consumer selected date and destination, and executing a reverse affinity algorithm to determine a trend in the affinity ratings of the different elements of the exactly matching package. The trend in the affinity rating can then be set as a consumer constraint to determine an appropriate package schema which is, in turn, used to construct packages with the same theme. Alternatively, different destinations or packages may be associated by operators with certain themes and the theme destination process is configured to search for the theme of the consumer selected destination and return other packages having the same theme.

In another aspect, all of the extrapolated results can be further screened for duplication, price and popularity for the purposes of pruning the search results and the packages presented on a single screen for easy viewing and purchase by the consumer. In addition, elements of the packages, or the packages themselves, may be stored in a cache for quick access, searching and retrieval. Advantageously then, the consumer can quickly receive a range of extrapolated travel packages from the entry of a minimum of information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 4A-4C show example item entry operations;

FIGS. 11A-11D show example order execution operations;

FIG. 21 shows a screen format generated by the computer system of FIG. 12 for storing a return date;

FIG. 22 shows a screen format generated by the computer system of FIG. 12 for presenting exact match search results and several types of extrapolative search results.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
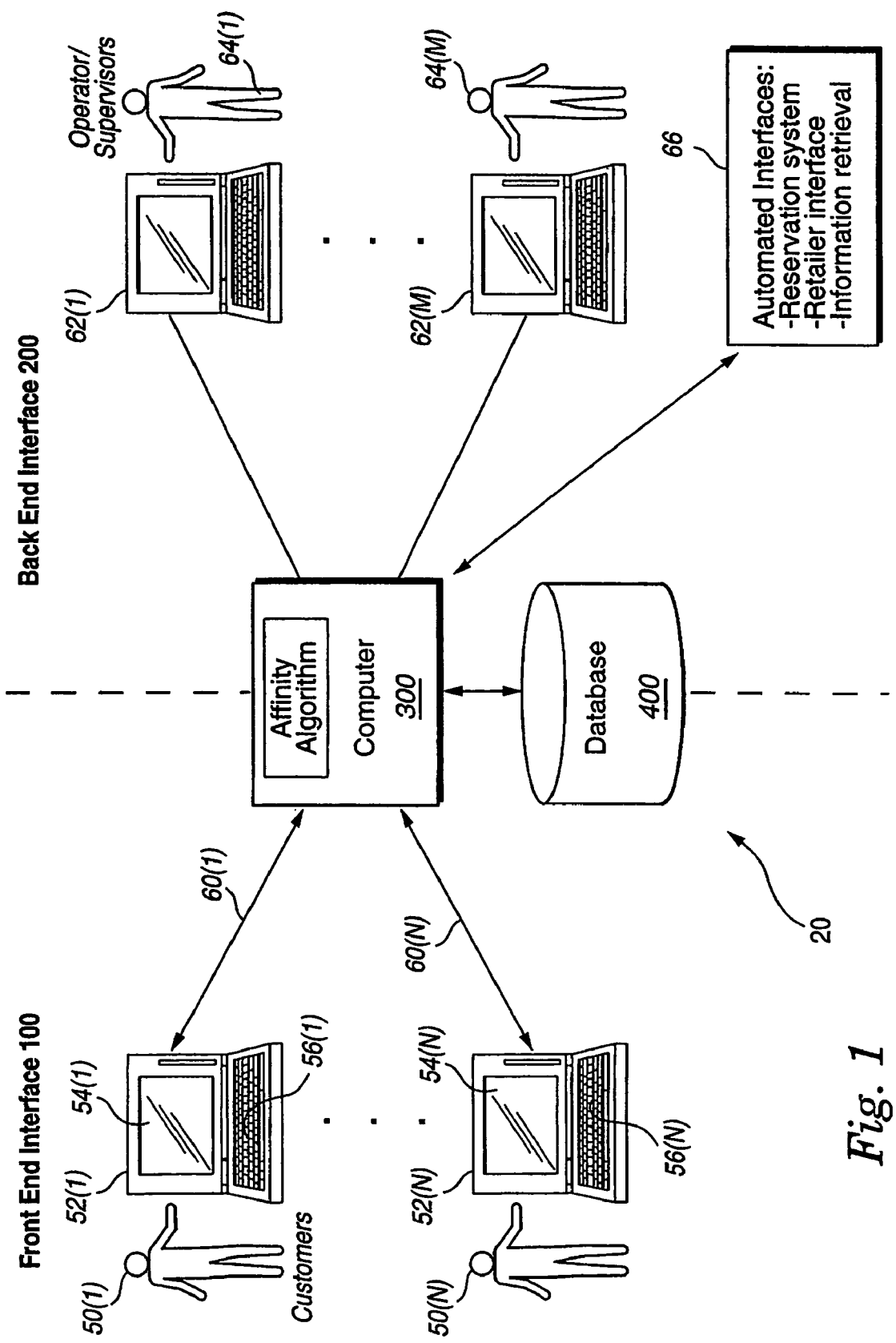
FIG. 1 is an overall block diagram of an example system 20 provided by the present invention.

FIG. 1 shows an example computer system 20 providing a preferred example embodiment of this invention. The FIG. 1 computer system 20 includes a front end 100 interface and a back end interface 200 supported by a computer arrangement 300. Generally, front end 100 is used to interact with consumers 50(1)-50(N) via associated consumer appliances 52(1)-52(N). Consumer appliances 52 in one example embodiment include a display 54 and a user input device such as a keyboard 56, a pointing device, speech recognition or any other device capable of accepting inputs from a human being and providing responsive output signals. In one specific advantageous embodiment consumer appliances 52 comprise personal computers equipped with conventional web browsing software, but any appliance capable of interacting with consumers 50 by presenting options for selection and receiving selection responses can be used.

In this example embodiment, consumer appliances 52 are coupled to a computer arrangement 300 via telecommunications paths 60. Telecommunications paths 60 coupling consumer appliances 52 with computer arrangement 300 may comprise any type of digital or analog telecommunications signal path, but in the preferred embodiment include or comprise a decentralized digital computer network such as the Internet. Telecommunications paths 60 allow consumers 50 to interact on a real-time, dynamic basis with computer arrangement 300 from the consumers' homes. offices or other locations.

In this example embodiment, computer arrangement 300 communicates with consumers 50 by transmitting information such as html web pages, audio, video and/or multimedia information to consumer appliances 52. This transmitted information is displayed on displays 54 or otherwise rendered so that consumers 50 can perceive the information. Consumers 50 may respond to the received information by providing user inputs via user input devices 56. These user inputs are transported to computer arrangement 300, where they may influence or control the processes being performed by system 20. In this way, consumers 50 may interact in real-time with computer 300 to view and select options, purchase goods and/or services, request additional information and the like. A database 400 stores information that is analyzed by an affinity algorithm to dynamically generate packages to be offered to the consumer for sale.

Back end interface 200 in this example includes operator appliances 62(1)-62(M) respectively operated by human operators 64(1)-64(M). Back end 200 in the preferred embodiment also includes other interfaces 66 to be discussed below. In this example, back end interface 200 is used to receive, define and input information, which may then be offered by system 20 to consumers 50.

System 20 reduces the complexity for the customer 50. That complexity is instead managed by system 20's workflow and systems. The key elements of system 20's Web architecture allow efficient gathering of inventory information, quick authoring of packages, attractive presentation of products, robust fulfillment of customer orders, and responsive customer service. To accomplish this, a scalable database-backed system is provided, leveraging existing systems wherever this is possible and economical.

Example Travel Services Application

Figure 2A:
FIGS. 2A-2S show example screen formats the server computer may present to customers.

In one particular advantageous example, system 20 provides an online service to break the compromise for consumers between high quality, good value solutions and last minute planning. System 20 can present consumers 50 with an interactive user interface via appliances 52 that creates a last minute entry point for consumers focused on last-minute leisure. FIG. 2A shows an example homepage displayed by system 20 presenting a menu of five example options.

Getaways—short trip, long weekend, vacation

Around Town—today, tomorrow, this weekend, this week

Quick Gifts—apologies, congratulations, thanks, indulgences, etc.

Red Carpet—Hard-to-get "must-have" items (sold via auctions)—flights, tickets, hotel rooms, and restaurant reservations White Glove—Last-minute services such as party planning, baby-sitting, car service, dry cleaning, etc.

System 20 in this particular example focuses on the last minute, offering solutions in a rolling seven-day window, and organizes and packages offers by "mood occasion" (e.g., Romantic or Adventurous). System 20 offers a finite list of tailored options, and is a one-stop proposition from idea to fulfillment. Everything shown is guaranteed available. System 20 does all the hard work for consumers—starting with thinking up good ideas about what to do. The typical frustration of coming up with ideas, calling around for availability, putting the pieces together, etc. is entirely avoided. System 20 develops and provides ideas and full solutions (e.g., a romantic escape from San Francisco this weekend, a wacky evening in New York on Thursday). System 20's offers are creative, unique, very high quality, and tailored to a customer's needs.

System 20 enters the consumer's decision process several steps upstream from where the travel and entertainment industry currently competes. System 20's entry point is when the consumer is thinking "I'd like to do something fun this weekend or this evening" or "Joan just had a baby, I should send her a gift" rather than "Let's see if we can get cheap tickets to Miami on Friday" or "I wonder where is the best place to buy a toy." System 20's consumer offers are designed by time (e.g., today, tomorrow, this weekend) and type of experience (e.g., adventurous, romantic, rest and relax, etc.), not just by destination or event (e.g., airline tickets to Miami, hotel rooms in Key Biscayne, or tickets to the Dolphins game). System 20 develops and provides ideas and full solutions (e.g., a romantic escape from San Francisco this weekend, a wacky evening in New York on Thursday). System 20 is able to shift share (because it enters the decision process before competitors); stimulate demand (because it generates ideas and suggestions); and reduce drop-off from idea to fulfillment (because it offers a complete, easy-to-navigate, one-stop solution).

For example, from the FIG. 2A example home page, the consumer might select the "getaways" option to bring up the FIG. 2B display. This example FIG. 2B display includes particular options such as "day trip," "short weekend," "long weekend," and "vacation." If the consumer selects the "short weekend" option, then a display of the type shown in FIG. 2C can be presented in this particular example to elicit one or more constraints from the consumer. For example, FIG. 2C allows the consumer to select a departure city (e.g., New York, Chicago, Los Angeles, or other city) via a pull-down selection, as well as a "mood" selection. The example FIG. 2C mood selection is intended to elicit "mood" information from the consumer, i.e., "what kind of short weekend escape are you in the mood for?" Example mood selections might include:

popular
romance and relax'n
beach
splurge
culture
family
budget
wacky
party hard
sports and adventure
golf or ski
single
hot spots
bestsellers and landmarks
all These various mood selectors are examples only—other particular mood selectors could be used, or possibly, other ways of eliciting the consumer's mood and/or other constraints could be used. The FIG. 2C example also allows the user to select logistical information such as how many people are traveling, the number of rooms required, etc.

Suppose the consumer selects a "cultural" mood selector and subsequently selects the "go" button of example FIG. 2C. At this stage, system 20 accesses its stored database of "cultural" package schema and, based on available inventory and consumer constraints', dynamically creates a finite number of packages based on an affinity algorithm analysis. An example resulting display is shown in FIG. 2D. In this example FIG. 2D display, a number of options are listed including, for example, a "Remember the King" weekend escape visit to attend an Elvis Presley (rock singer) tribute weekend; an "art and pampering" weekend in Washington D.C.; and an "afternoon tea and symphony" weekend in Boston. The preferred example system 20 does not make an attempt to display an exhaustive list of all possible romantic weekend escapes, but rather displays a shorter list of weekend escapes that are—based upon the current database state—guaranteed to be available if the consumer immediately purchases the package.

In the FIG. 2D example, each of the package displays includes a one-line description along with a hypertext link, which the consumer may select to learn more about the proposed package. For example, if the consumer selects the "Remember the King" hypertext link, then a more detailed descriptive display (an example of which is shown in FIG. 2E) may be displayed. This more descriptive display outlines the various components within the package, including transportation, hotel, car rental, restaurant, entertainment and/or other components of the package and may give the consumer the option of requesting upgrades and/or adding on optional components.

From either the FIG. 2E or FIG. 2D display in this example, the consumer may select a "buy it" button to bring up a procurement selection confirmation display of the type shown in FIG. 2F, for example. In this particular example, the FIG. 2F selection configuration display shows the unit price, additional pricing information and the total cost. In the FIG. 2F example, the consumer may also enter a "promotional code" within a data entry field to obtain the benefit of a promotional special if one is available. If the consumer agrees to purchase the package, he or she may select the "continue checkout" button of the FIG. 2F display to obtain a further FIG. 2G "checkout" example display. The FIG. 2G display may display pertinent identification and payment information the consumer has previously inputted to system 20 during a registration process, and requests further confirmation. Typically, the prices shown in FIG. 2F will simply be repeated in the FIG. 2G display, and the consumer may select the "submit" button of FIG. 2G to actually purchase the package. Upon purchasing the package, system 20 may display an "order confirmation" display similar to the example display shown in FIG. 2H that confirms the package order, provides an order confirmation number and gives the consumer an option of obtaining a full itinerary (see FIG. 21 for an example). At this point, the consumer has ordered and purchased the package, and computer 20 automatically generates output signals to procure the necessary tickets electronically or otherwise. In addition, system 20 updates its inventory database on a real-time, dynamic basis so that the next consumer is not offered inventory that is no longer available, and may send further confirmations and/or reminders to the consumer via e-mail or by other means.

Figure 2J:

Referring once again to FIG. 2B, system 20 is also capable of showing the consumer individual components of a travel package should the consumer be in the market for only airline tickets, hotel accommodations, or the like. For example, if the user selects the "just show me flights" selection offered by the example of FIG. 2B, the consumer might be presented with a display along the lines of the example shown in FIG. 2J that bypasses the "mood" selector and package generator, and instead gives the consumer direct access to the database inventory of flights available during the selected time frame. Upon selecting further options, the user might be presented with a list of available destination cities, and could access the available flight information from the database. Similar selections might be available for hotel rooms, car rentals and other travel acconiunodations. (The price of the "just show me" tickets, hotels, etc. may be higher than the price of the same items when sold as part of a "getaways" package.)

Referring once again to FIG. 2A, the consumer could select an "around town" option to cause system 20 to dynamically develop packages that do not involve travel. In this example, selecting the "around town" selection could bring up, once again, a screen eliciting consumer constraints such as the time frame the consumer is interested in doing something (e.g., today, tomorrow, this weekend, or over the next week) (see FIG. 2K). Upon selecting a time frame option, a "mood" selection display similar to that shown in FIG. 2C can be presented to elicit the consumer s "mood" and upon receiving the consumer's response, system 20 may then generate and display a list of available "local flavor" packages available for selection and purchase. Referring again to FIG. 2A, selecting the "Quick Gifts" option could bring up a display of the type shown in example FIG. 2L eliciting a category of gifts. Upon selecting one of the categories, system 20 displays an example of the type shown in FIG. 2M presenting a finite list of gifts within the selected category for the user to select and possibly purchase. In this example, the consumer can obtain more detail (e.g., including an image if one is available) by selecting an associated hypertext link, and purchase the gift by clicking on the "buy it" button of FIG. 2M.

Referring once again to FIG. 2A, the consumer can select the "red carpet" option to display a list of "hard to get" individual items (like "just show me") or packages (like "getaways") available on auction (see FIG. 2N). Selecting the "hotel rooms" option of FIG. 2N could bring up a display similar to that shown in the FIG. 20 example. In the FIG. 20 example, the consumer may be given an option to "bid" on a particular offering, thereby entering an auction. Upon selecting the "bid" option, the consumer may be presented with a screen of the type shown in FIG. 2P and given an opportunity to submit a bid. The FIG. 2P screen informs the consumer that the supplier of the particular inventory has set an "auction clearing" price upon which the consumer will automatically win the auction, but the preferred example does not disclose that price in order to bid the supplier's base price from deteriorating.

Referring once again to FIG. 2A, selecting the "White Glove" option may resulting in presenting the consumer with a list of various service provider categories such as that shown in FIG. 2Q. This example screen allows the user to select a service category and be presented with services from service providers within that category which the consumer may select to purchase as described above. System 20 may also offer packages available for "rewards" (within the constraints of local regulations) as shown in FIG. 2R, as a way of thanking loyal customers. A registration process is also provided upon registering with system 20, this registration process eliciting appropriate identification information, payment method, password and the like. Selecting "my account" from the FIG. 2A home page may result in a display such as that shown in FIG. 2S listing current loyalty points, dream escapes, past purchases (with options to right of review), gift reminders, and participation in message boards. System 20 may also offer functionality such as read and post messages, chat rooms and the capability to write reviews on packages and trips taken.

Both consumers and suppliers get a much better solution from system 20 versus other providers. Consumers get great values because Site59 is able to offer packages at a discount to what the consumer would if he or she created the package on his or her own (due to established partnerships with suppliers). Also, consumers get great suggestions and offers, easy navigation through intelligent categorization and truncation, one-stop solution including fulfillment, and guaranteed availability at the last minute. System 20 does all the hard work for consumers—starting with thinking up good ideas about what to do. Furthermore, suppliers such as airlines, hotels, and events venues get true demand creation; low visibility on low-priced last minute inventory; avoid the need to offer "the cheapest tickets" in order to make a sale; avoid cannibalization of regular demand; and avoid brand erosion. System 20 offers suppliers a substantially better channel for mobilizing distressed last minute inventory versus all other emerging options such as Internet e-saver fares, sites that promote "cheap tickets", sites that enable planning ahead, and sites whose proposition is an exhaustive listing of destinations and/or events that facilitates substitution of planned demand. In addition, suppliers also attain higher than normal price realization on high demand items that are sold via auction— such as hotel rooms in New York between October and December, or same day dinner reservations at a hot new restaurant.

System 20 prevents yield dilution/demand cannibalization because it creates new demand rather than fulfills existing demand (e.g., a romantic weekend can be designed around available inventory rather than having to be to a particular destination where that consumer has already decided to go). Furthermore, system 20 prevents sales from cannibalizing suppliers' regular demand. Consumers cannot plan ahead and use system 20 to get cheaper prices because system 20 only has a rolling seven-day window. Moreover, consumers cannot expect to get exactly the cheap ticket they want at the last minute because system 20 makes offers by type of experience (e.g., romantic), not by destination. For example, escapes to London will not always be offered, so consumers who know they want to go to London will need to use suppliers' traditional channels. System 20 thus, limits brand erosion because it bundles the base inventory with other elements into one composite offer and price; eliminates the need to offer "the cheapest tickets" in order to make a sale; reduces suppliers visibility as it is an arms-length entity distant from a supplier's brand and main business; and is technically capable of quickly accepting and processing last-minute inventory.

System 20 as described can provide a new kind of "one-stop" last-minute travel portal, or some or all of the functions described above can be integrated with other types of travel portal web sites or other platforms. For example, such functions may be very attractive to build a third party package creation/delivery platform for other businesses to use or access via links from their web sites or other platforms. As one example, a more conventional travel website or other platform could include a "last minute travel" button or function that can invoke some or all of the activities described above. The example embodiment package authoring arrangement, travel and entertainment database(s) organized by type of experience, supplier relationships and interfaces, business-operations engine (back end) geared to last minute window, and other aspects could be used and/or integrated by such other platforms (e.g., via hypertext links) to create last-minute travel or other types of packages for customers.

More Detailed Description of Example System 20

Figure 3:
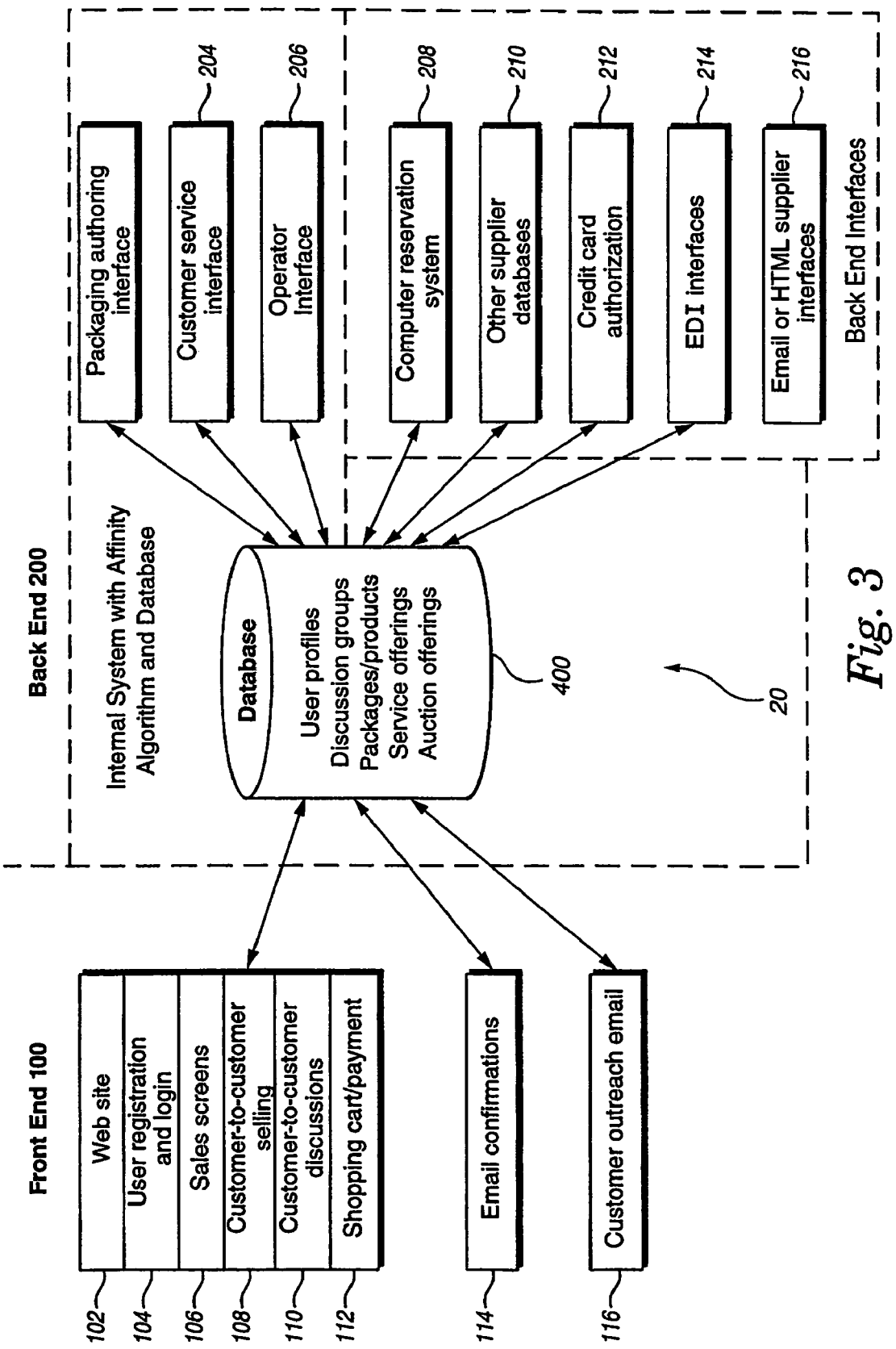
FIG. 3 is a block functional diagram of a presently preferred exemplary embodiment of a computer system 20 provided by this invention.

FIG. 3 shows a more detailed diagram of the functions provided by system 20. As described above, system 20 includes a front end interface 100 and a back end interface 200 each of which may be supported by one or a number of computers within computer arrangement 300. Briefly, the tasks performed by system 20 include five separate processes.

1. Item entry is a process performed at the back end interface 200;

2. Package schema entry performed at the back end interface 200;

3. An affinity algorithm used in the computer 300 to group items into packages;

4. A package selection process is performed at the back end interface 200, and selects packages to be presented at the front end interface 100; and 5. The sales and purchase process is performed at the front-end interface, inside the computer 56, and potentially at the back end interface 200.

In more detail, computer arrangement 300 maintains a database 400 including the following elements.
    user profiles
    discussion groups
    packages/products
    service offerings
    auction offerings.

Database 400 interacts with the following major functions performed by front end interface 100:
    web site 102
    user registration and login 104
    sales screens 106
    customer-to-customer selling 108
    customer-to-customer discussions 110
    shopping cart/payment 112.

Front end interface 100 may also provide additional communications capabilities relative to consumers 50 via e-mail confirmations 114 and/or customer outreach e-mail 116.

Back end interface 200 in this example includes a variety of functions that may be performed within the third party operator of system 20 as well as a variety of functions which may be performed outside of that third party provider. The functions within the third party may include a package authoring interface 202, a customer service interface 204 and an operator interface 206. External sources, computers or the like communicating with database 400 via back end interface 200 may include:
    computer reservation service 208
    other supplier databases 210
    credit card authorization 212
    EDI interfaces 214
    e-mail or html supplier interfaces 216.

In this particular example, computer arrangement 300 supporting the various functionality shown in FIG. 3 may include a conventional http web server such as an AOL server or the like, and one or more further computers, such as, for example, a dual-processor Sun E450 running Solaris and an Oracle 81 database engine with a Cybercash payment interface. Computer reservation system 208 may be interfaced with via, for example, a Sabre or Worldspan CRS interface running on a separate NT workstation. Those skilled in the art will recognize that a variety of different conventional computer arrangements can be used to implement suitable computer arrangement 300.

The expectation is that system 20 can handle 800,000 page loads per day (approximately 4 million "hits" by common definitions), each requiring about five database transactions. During peak load periods, this will be approximately 100 DB transactions per second. The system can be scaled to about 50 times this capacity by separating the HTTP server from the database engine and replicating it in an array of load-balanced PC servers running Linux and sharing an IP address. Network hardware from Cisco Systems can accomplish load balancing. The back-end 200 can be scaled by using Sun Enterprise servers, which can accept up to 64 CPUs.

Example High Level Operatings From the Supplier to Sale

Figure 3A:
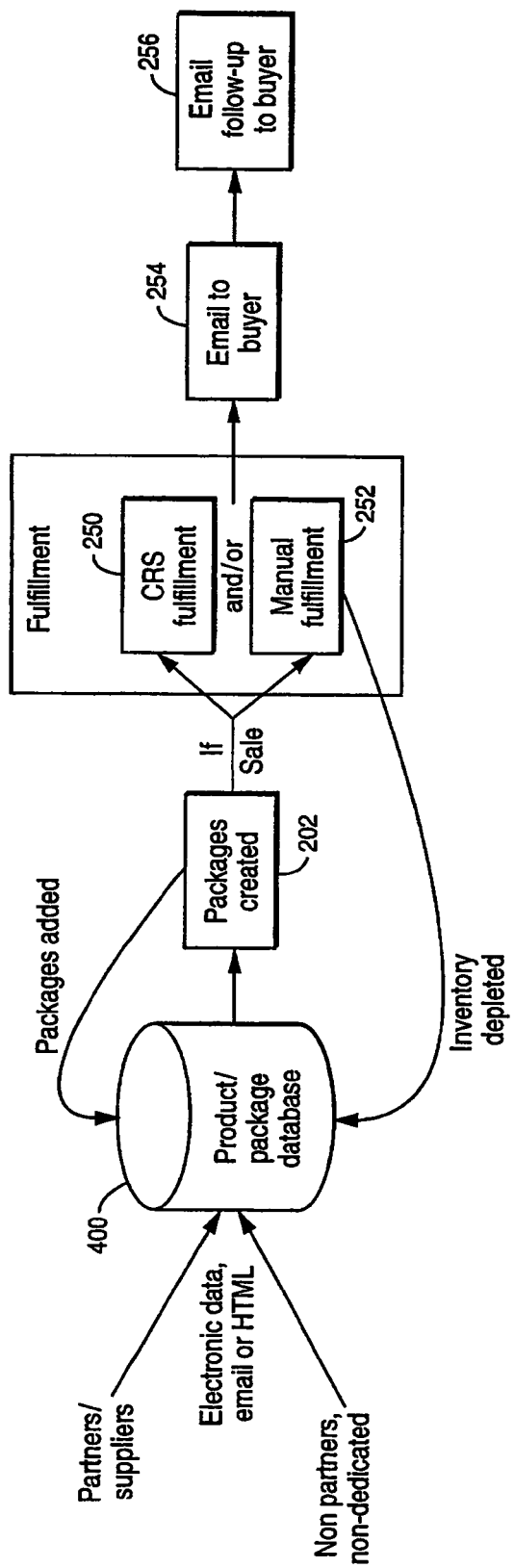
FIG. 3A is a flowchart of an example high-level operations process.

FIG. 3A in the flowchart of example high-level operations from supplier to sale within system 20. In this example, partners/suppliers (e.g., airlines, hotel chains, and the like) as well as non-partner suppliers supply information concerning available travel related items via electronic data, e-mail, html or in other forms via interfaces 208, 216 and/or supplier databases 210. One example interface 216 may, for example, involve screen scraping of pertinent data from conventional, publicly-available legacy web-based or other computer interfaces from standard travel service providers (e.g., airline reservation systems, hotel reservation systems, etc.). The various items are deposited into database 400 along with attribute information.

Package offering interface 202 is used to create package schema which are also added to the database 400. In the manner described in detail below, packages are dynamically generated and offered to consumers 50 via web site 102. Upon purchase, system 20 purchases the various component items within a given package on behalf of the consumer 50 via automatic and/or manual fulfillment processes (blocks 250, 252), and then e-mails or otherwise communicates confirmation to the consumer buyer (blocks 254, 256) via e-mail confirmation block 114 shown in FIG. 3.

Figure 3B:
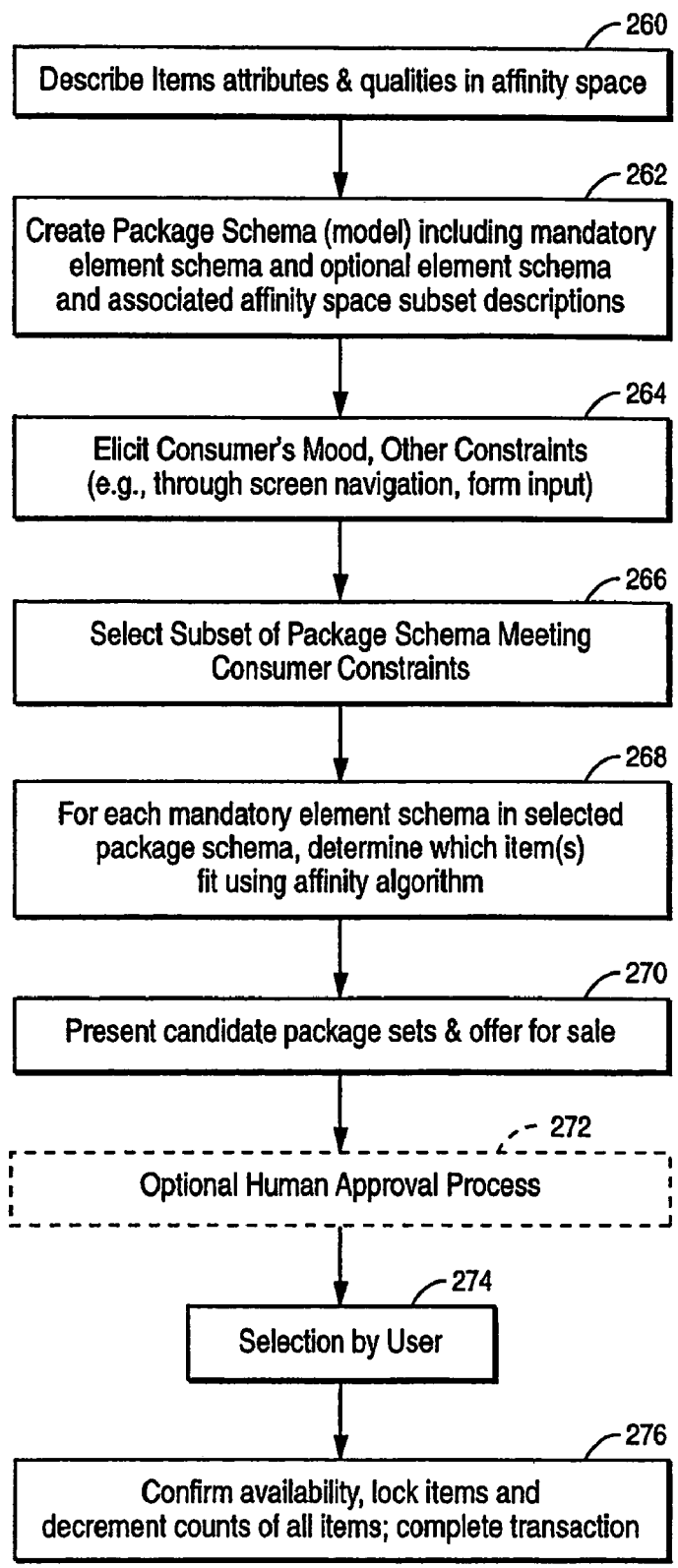
FIG. 3B is a more detailed example flowchart of a package creation process.

FIG. 3B shows an overall more detailed process by which system 20 performs the "packages created" step 202 of FIG. 3A. Referring to FIG. 3B, a human and/or computer 300 describes each of the items in inventory in terms of attributes and qualities within an n-dimensional affinity space (block 260). These items and their associated attributes and qualities are then stored into database 400 for later access. In addition, a human creates package schema (i.e., models or templates) of packages of items a consumer might wish to purchase (block 262). Such package schema may include mandatory element schema (e.g., airline tickets and hotel) as well as optional element schema (e.g., show tickets). Each schema in this example includes an associated affinity space subset description (i.e., an n-dimensional hypercube or other bounding box describing the subset of affinity space that will satisfy the particular element requirement). As an example, the author of the package schema could specify a restaurant with an "expense" range of between 3 and 9, and with food quality greater than 6 on some given quality and expense continuum. Another, more simple example is that a particular hotel chain could be specified as the only hotel inventory that can be used to satisfy a particular element schema.

Figure 3C:
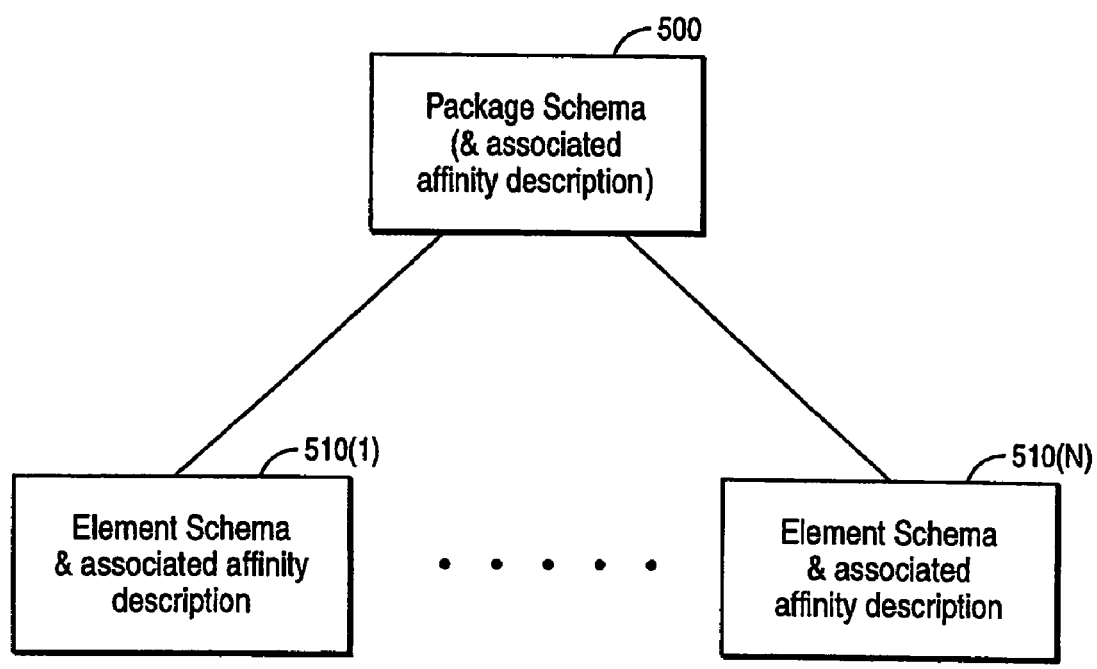
FIG. 3C shows an example package schema structure.

As shown in FIG. 3C, a particular package schema 500 can have any number of associated element schema 510 and associated affinity descriptions. The created package schema are stored into database 400.

In the preferred example embodiment, through real-time interaction with a consumer 400, computer 300 elicits the consumer's mood and other constraints (FIG. 3B, block 264). This eliciting process may occur through the consumer navigating screens of a web site, filling in html forms, or other means. Once system 20 has elicited the consumer's constraints, it selects a subset of created package schema meeting the consumer's constraints (block 266). Then, for each mandatory element schema within the selected subset of package schema, system 20 determines (using an affinity algorithm in the affinity descriptions described above) which items "fit" or match (block 268). In one example, matches can be ordered or otherwise selected based on distance in affinity space.

Blocks 266, 268 in one preferred embodiment are performed dynamically in real-time to produce a candidate set of packages which may then be presented to a consumer 50 and offered for sale (block 270). An optional human approval process may be interposed (block 272) to approve presented packages and/or created package schema, in order to make sure that the packages presented to the consumer are reasonable and make good business sense for the third party who is operating system 20 (block 232).

Upon selection of a particular package by consumer 50 (block 274), computer system 300 confirms available, locks the items in the database 400 and decrements the count of all selected items within database 400 and completes and confirms the transaction with the consumer (block 276).

Example Item Entry

One of the functions performed by system 20 is to input items (for example, travel inventory) into database 400 so it is available for creating packages. Item entry can be performed via the operator interface 206 and operator appliances 62 shown in FIG. 2. Alternatively, or in addition, items can be entered automatically by computer via various interfaces from a computer reservation system 208 and other supplier databases 210, and/or via e-mail or html supplier interfaces 206. One example item entry process is shown in FIGS. 4A-4C.

In this example item entry, an operator 64 at the back end 200 views available item descriptions from an external inventory list, perhaps held in an external computer system (FIG. 4A). These items may be products or services. The operator 64 then selects items to enter into the server computer system according to some criteria. The items are described by the operator as having certain attributes; the attributes may simply be arbitrary text strings describing some aspect of the items. An example is an item that is a reservation for a hotel room; one attribute might be "hotel in New Orleans;" another attribute might be "double occupancy room;" still another attribute might be "Hyatt Regency New Orleans."

The items are further described by the operator 64 as having certain coordinates in an affinity space (FIG. 4A). In this example, an affinity space is an n-dimensional space with real coordinates, each dimension describing some quality of an item. For example, an affinity space for restaurants might include the qualities "service," "romance," "impressiveness," and "food quality." Then a particular restaurant could be described as a point in 4-dimensional space, the first dimension being "service," the second being "romance," etc. More positive numbers denote more of the quality in question; less positive numbers denote less of the quality in question. Thus if two restaurants are represented by points $(x1, y1, z1, w1)$ and $(x2, y2, z2, w2)$ in the affinity space, they can be compared on these qualities by comparing $x1$ to $x2$, $y1$ to $y2$, etc, or by actually using a quality function (a simple example being distance between the two restaurants). Affinity coordinates can be discrete or continuous, and can if specify a range of values and/or a true/false condition. One example type of affinity coordinate is a binary (yes/no) value specifying whether a hotel is or is not romantic, whether a restaurant is or is not expensive, etc. Another example is type of affinity coordinate can specify a range of values (e.g., romance on a scale of 0 to 10).

When the operator 64 has entered the descriptions of the items into the computer 300, including their attributes and their coordinates in the affinity space (FIG. 4C), they are stored in the database 400 or on backing store in the computer system 20.

Alternatively, this operation may be performed by a program using some method to parse the external item descriptions into item descriptions with attributes and coordinates in the affinity space. For example, such a program might recognize the string "deluxe service" in an external item description (e.g., Zagat's guide) as corresponding to a value of 9 for the first coordinate, "service," in the affinity space.

If the items being sold are programs or data or some combination of these, or if it is useful to provide programs or data to the customer when the items are sold, the item descriptions may be accompanied by the programs or data so that these can be stored and provided to the customer directly from the computer 300.

Example Package Schema

The operations shown in FIGS. 4A-4C and described above generate a database of available inventory of items along with affinity coordinates and attributes associated with each item in the inventory. The preferred example system 20 uses additional pre-stored information in the form of package schema 500 to dynamically assemble individual inventory components into a package.

In this example embodiment, a package schema consists of a package description in some form, possibly including text, images, animations, etc., along with a vector of package element schemata. Each element schema consists of a field stating whether this element is mandatory or optional, a list of required attributes, and a description of a subset of the affinity space; for example a closed n-dimensional rectangle in an n-dimensional affinity space, or a half-hyperplane, etc. The package schema describes then the items that can be used to make up a package. Each package schema 500 can include any number of element schema.

Figure 5:
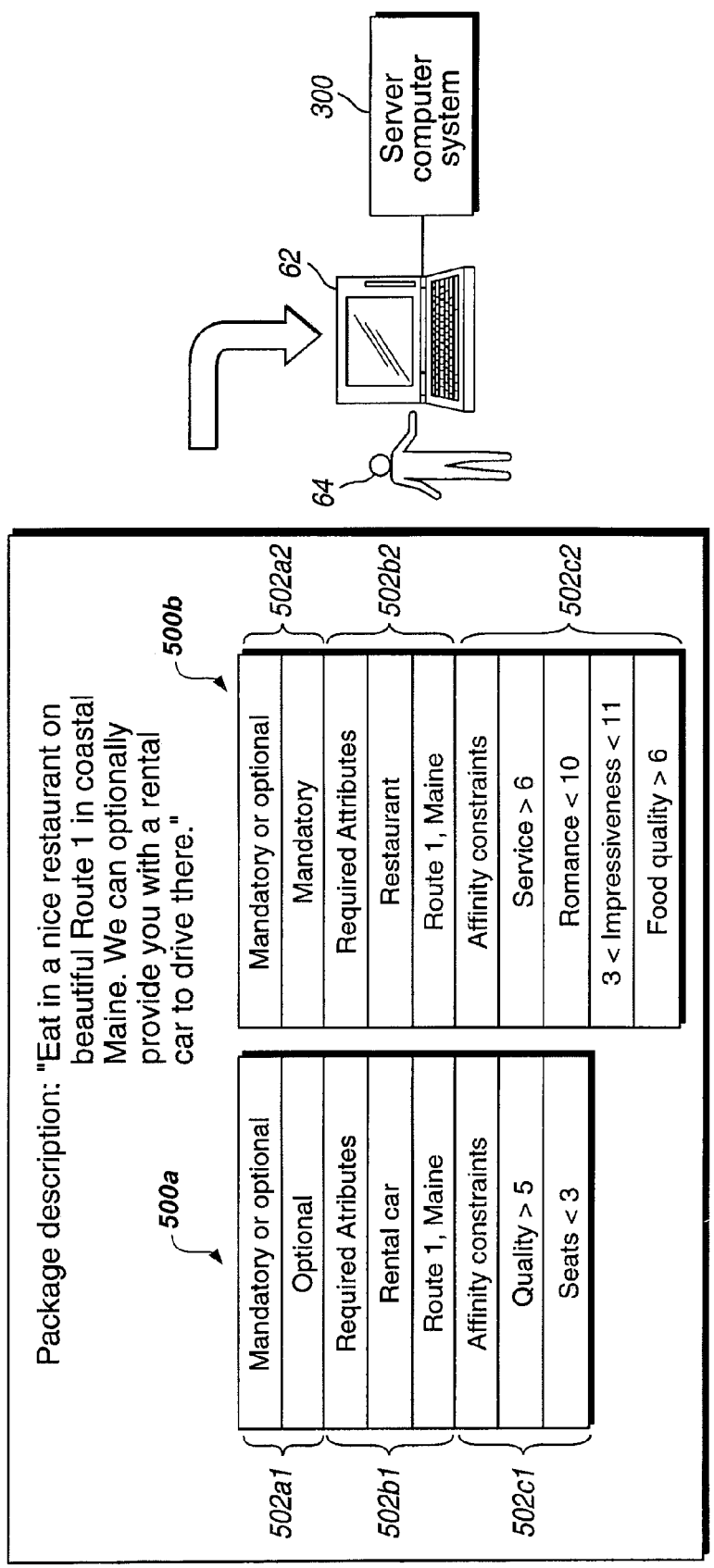
FIG. 5 shows an example package schema entry.

FIG. 5 shows examples of two different package schemas 500a, 500b. In the FIG. 500a example, the package schema includes a field 502a(1) indicating that the element is optional, a list 502b(2) of required attributes including rental car, and "Route 1, Maine"; and affinity constraints 502c(1) indicating a quality coordinate of greater than 5 and a seats coordinate of greater than 3. In the FIG. 500b example, the required attributes field 502a(2) indicates that the element is mandatory; the required attributes 502b(2) include "restaurant" and "Route 1, Maine"; and the affinity constraints 502c(2) include a service coordinate of greater than 6, a romance coordinate of less than 10, and impressiveness coordinate of between 3 and 11 and a food quality coordinate of greater than 6.

In this example, the package schema 500 are inputted to computer system 300 by a human operator 64 using appliance 62. However, it will be understood that automatic or other techniques can be used.

Example Affinity Algorithm

In this example, computer 300 executes an affinity algorithm to find items entered into the computer that can be used to make up a package defined by a schema 500. Briefly, the affinity algorithm is used to match or otherwise satisfy the previously entered schema 500 based on items previously entered and available in database 400. One possible affinity algorithm 600 (shown schematically in FIG. 6) is:

Initialize the candidate set to empty
For each package schema
    For each mandatory element in the package schema
        For each item
            If the item attributes include the required attributes of the element, and the item affinity coordinates match the affinity constraints of the element
            Then continue to the next mandatory element
            Otherwise continue to the next item
        If no item matches the mandatory element, continue to the next package schema
    When matching items have been found for all the mandatory elements, then add the package schema to the candidate set
When all package schema have been examined, return the candidate set.

Figure 6:
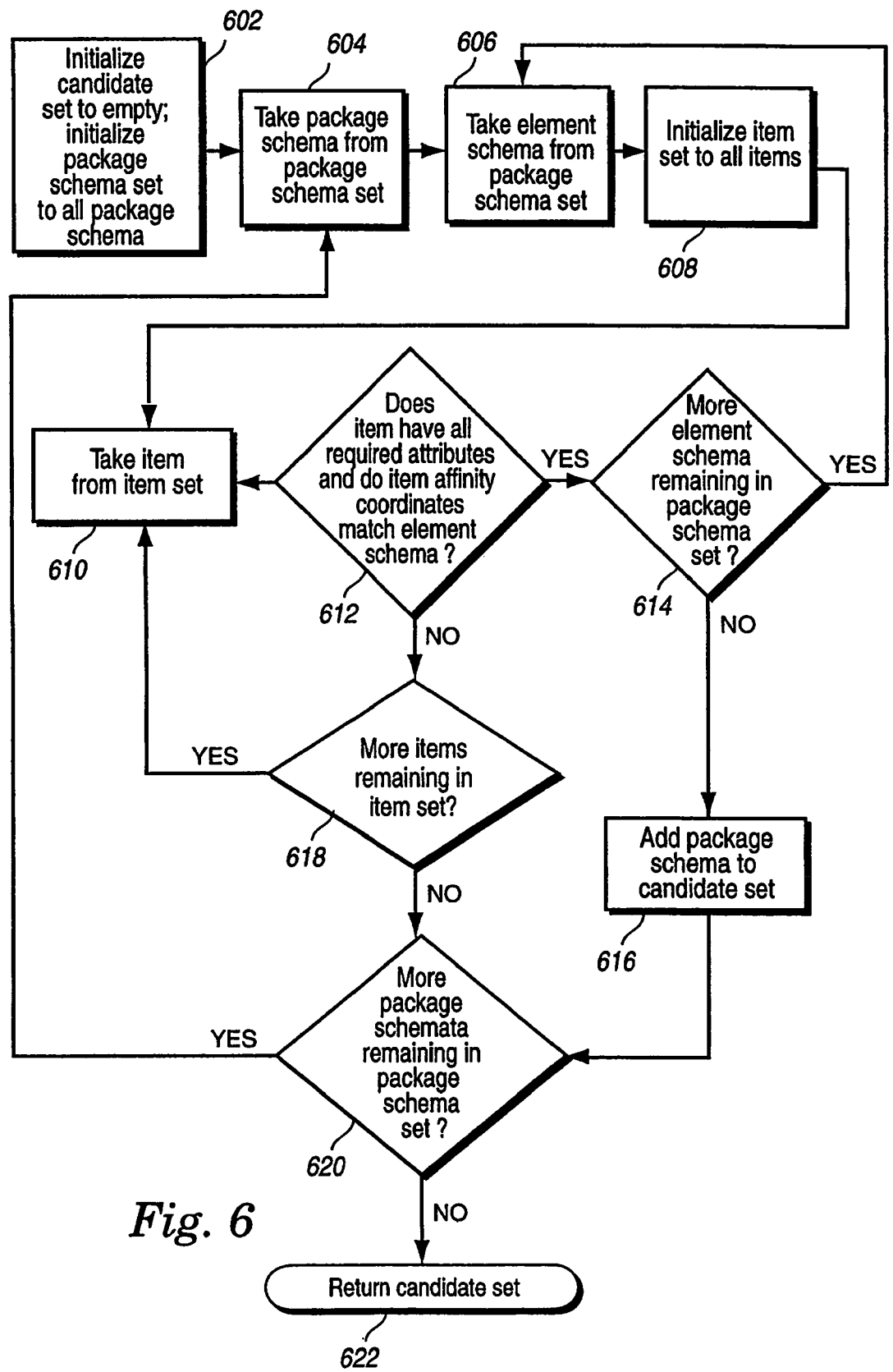
FIG. 6 shows an example affinity algorithm flowchart.

In more detail, the FIG. 6 example flow diagram shows an example affinity algorithm including an initialization block 602 in which computer 300 initializes a candidate set to empty and initializes a package set to all package schema. The algorithm 600 then takes a package schema from the package schema set (block 604) and takes an element schema from the package schema (block 606). The example algorithm 600 next initializes an item set to all items (block 608), takes an item from the item set (block 610) and asks the questions: "does the item have all required attributes and do item affinity coordinates match the element schema?" (block 612). If the block 612 condition is satisfied ("yes" exit), then algorithm 600 determines whether more element schema remain in the package schema (decision block 614). If additional elements schema remain ("yes" exit to decision block 614), then control returns to block 606 and steps 606-612 are repeated (iteratively). If all element schema within the package schema have been resolved ("no" exit to decision block 614), then the package schema is added to a candidate set for possible presentation to the consumer (block 616). If additional packages remain in the package schema set ("yes" exit to decision block 620), then control returns to block 604 to repeat steps 604.

Referring once again to decision block 612, if the criteria of decision block 612 are not satisfied (i.e., a particular item does not yet have all required attributes and/or item affinity coordinates don't match the element schema), then decision block 618 tests whether more items remain in the item set (block 618). If more elements remain ("yes" exit to decision block 618), then control returns to block 610 to take an additional item from the item set and perform the block 612 test. If no more items remain in the item set, on the other hand ("no" exit to decision block 618), then control returns to block 620. Once all package schemata in the package schema set have been processed ("no" exit to decision block 620), then algorithm 600 returns a candidate set for possible presentation to the consumer (block 622).

The execution of algorithm 600 may be speeded by maintaining a hash table of items keyed by attribute. In this case, the inner loop over all items in the computer system reduces to a hash table lookup for each required attribute, and the formation of the intersection of the sets of items having that attribute.

Example Package Selection

Package selection is the process by which packages from a candidate set are selected for sale. The example package selection process is both hierarchical and flexible at the same time. Under normal circumstances, two levels of management control are used to fully control this process. The 1st level, called here local content manager, executes a selection of certain packages out of the universe of available packages. These packages are chosen using a set of criteria. This set of criteria can be large, but common examples would include experience gleaned from past consumer behavior and inventory characteristics such as seasonality or unexpected supply due to some event. An example 1st level of selection process is shown in FIGS. 7A-7D.

Figure 7B:
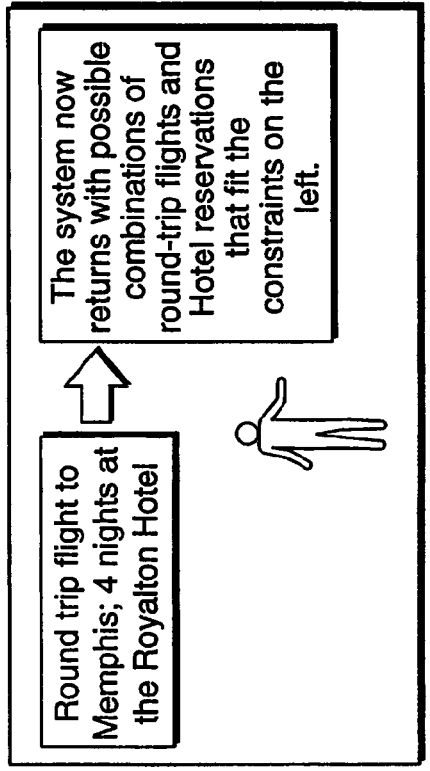
FIGS. 7A-7D show example management control operations.
Figure 7D:
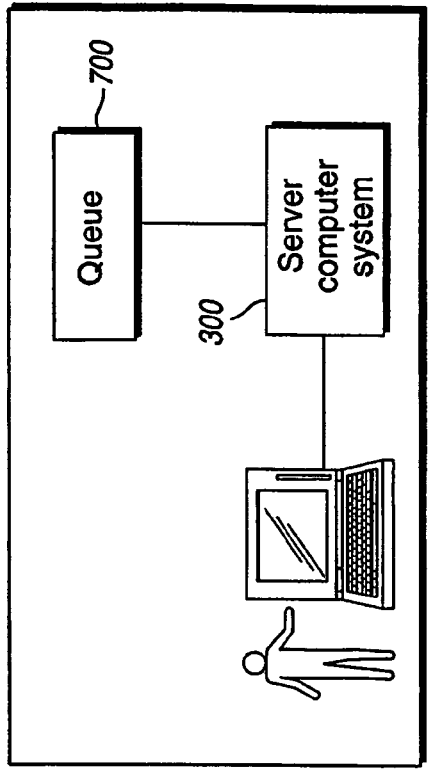
Figure 7A:
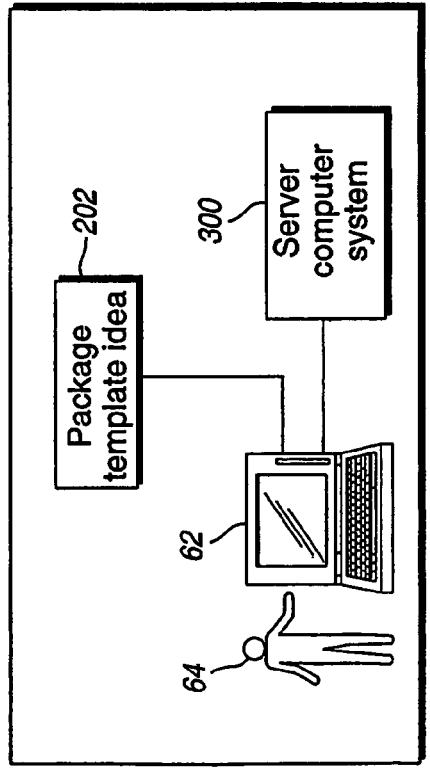
Figure 7C:
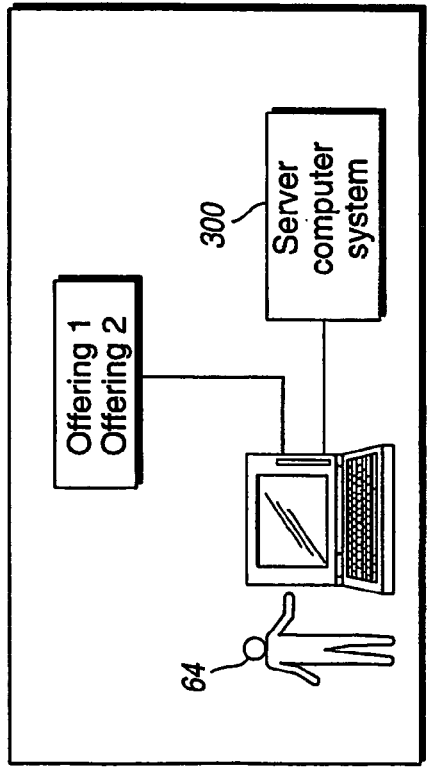

In the FIG. 7A example, a local content manager defines a package template using a package offering interface 202 via appliance 62. For example, an operator 64 may use the package offering interface 202 to define a package with possible offering information such as "round trip flight to Memphis, four nights at the Royalton Hotel." In response to this input, computer system 20 returns with possible combinations of round trip flights and hotel reservations that fit the constraints (see FIG. 7B). An operator 64 may then select offerings of interest (FIG. 7C), and put the selected offerings on a queue 700 for approval (block 7D).

A second more senior level, called here regional director, decides whether the distribution and content of the presented packages is reasonable on a more global scale (eastern US, national or possibly international). This level controls the actual release of the proposed or selected packages.

Figure 8A:
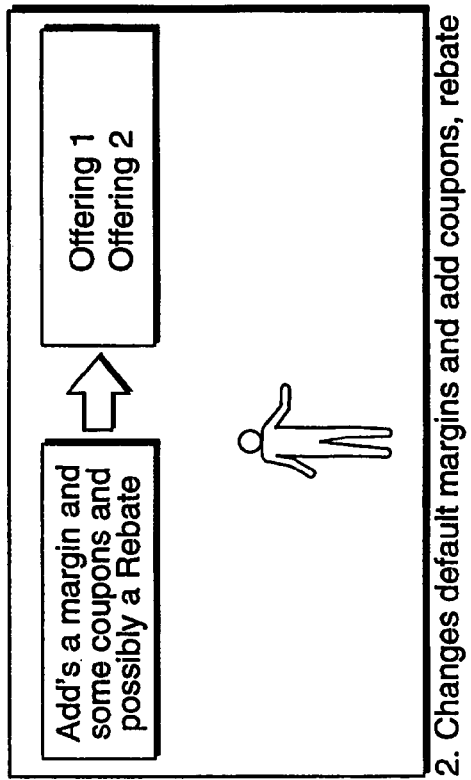
FIGS. 8A-8C show example operations for providing additional incentive characteristics to render a package more appealing.
Figure 8B:
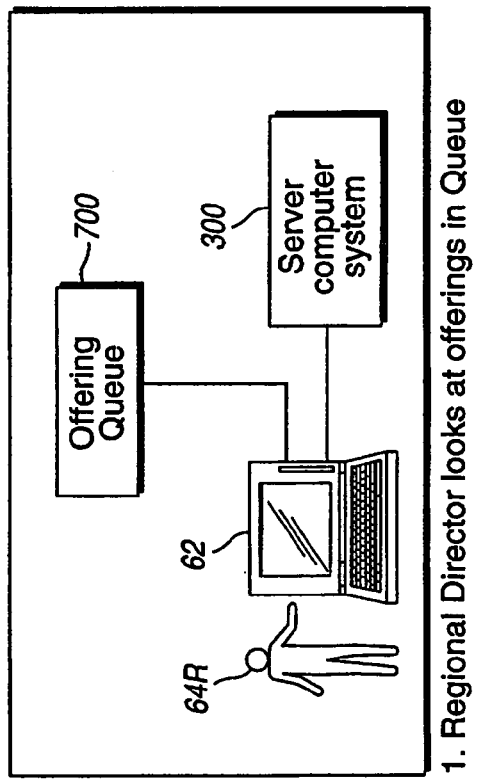
Figure 8C:
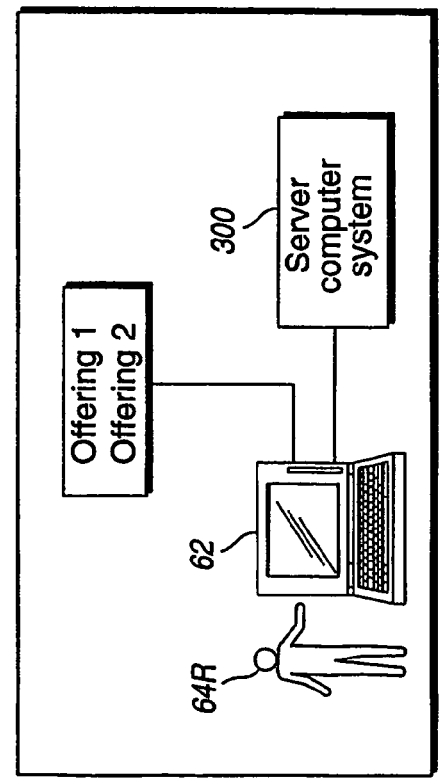

At this level or higher, additional incentive characteristics can be added to render a package more appealing. The reason to make a package more appealing could be due to many factors including promotional ideas, customer requests or preferences coming from feedback, satisfying some kind of performance criteria or other requirements present at a given time in a given region (for instance when flights are available at less convenient times, or the consumer would arrive too early to check into a given Hotel). This is shown in FIG. 8A-8C. In this FIG. 8A-8C example. a regional director 64r looks at the offerings in queue 700 and selectively modifies the offerings by, for example. changing default margins, adding coupons, adding a rebate, etc. (FIG. 8B). A regional director 64 authorizes (approves) of the posting of offerings. After release, the package becomes visible and hence available for sale at the front end.

In a way the actions of the Regional Director, for instance, could be viewed as adding additional coordinates on new dimensions. For example, in the n-dimensional case restaurant A and B are closest and C is further from both, but restaurant B only takes reservations Monday through Wednesday and patrons are always given less desirable reservation times. The Regional Director knows this so he assigns a high rating to restaurant A and C but a low one to restaurant B for this additional axis (call it 'customer flexibility'). In this now n+1 dimensional affinity space restaurant A and C are actually closer and B is more distant. When the customer sets his preferences he cannot directly set a preference for this latter one, but he still benefits from this. The Regional Director meanwhile might not be familiar with all the original n coordinates, but he is able to contribute by adding his knowledge in the form of an additional coordinate. Additionally some extra coordinate on a new dimension could be also derived from customer feedback. So we can now view this affinity space as having n+2 dimensions.

Example Sales and Purchase

The Sales and Purchase process represents the final step. The candidate sets of packages have already been authorized for presentation to potential customers on the front end of the system. The sales process begins when a consumer presents a set of interests (such as time of travel, departing city, type or mood of trip). The gathering of these coordinates is performed through a multi-level user interface that matches his choice of coordinates with a possible subset of the presentable packages. This intersection could be large or zero, but on average is expected to be a reasonably small number.

Figure 9B:
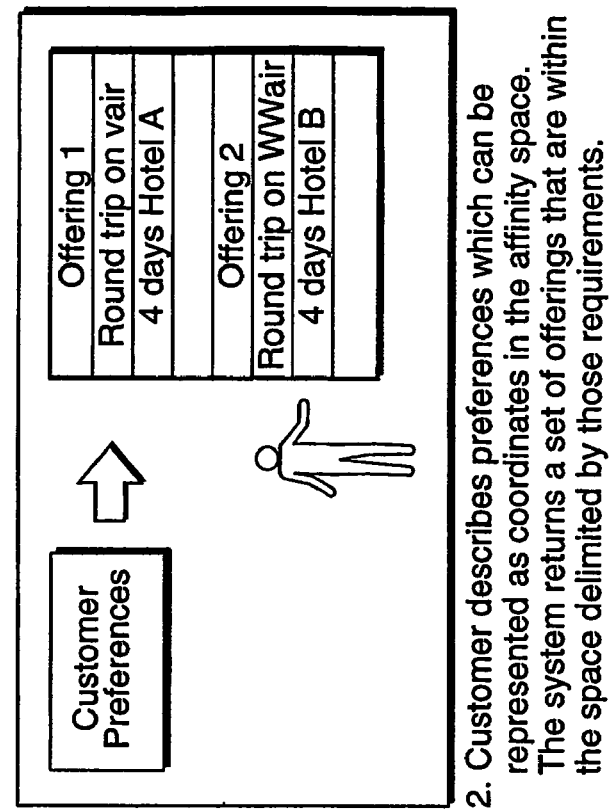
FIGS. 9A and 9B show an example matching process.
Figure 9A:
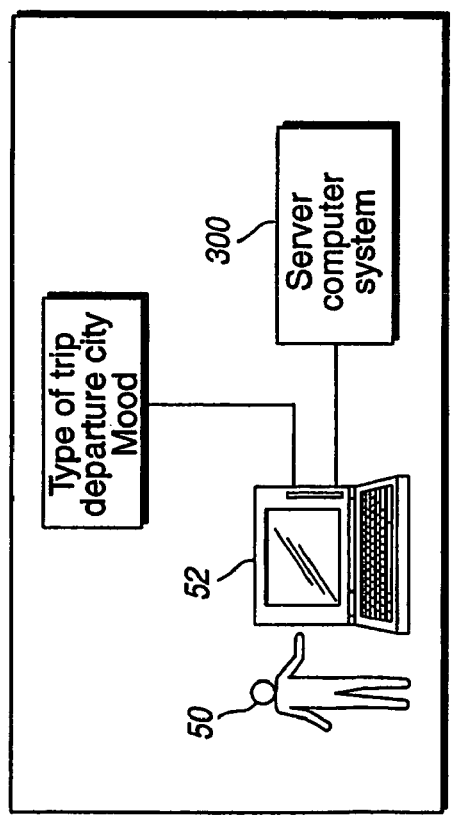

The consumer has now set up a list of constraints. These constraints are mapped directly onto the relevant axis of this affinity space. The result is usually represented by a set packages that fit either entirely (or partially) the subspace delimited by the consumers preferences. An example of this is process is displayed in FIGS. 9A. In this example, a consumer 50 uses appliance 52 to specify a type of trip, a departure city and a mood (see example displays described above in connection with FIGS. 2B and 2C, for example) (FIG. 9A). Computer 300 converts the consumer's mood, departure city and type of trip preferences into coordinates in the affinity space, and returns a set of offerings that are within the space delimited by those requirements (FIG. 913). The FIG. 9B process is performed dynamically in real-time based upon inventory currently available within database 400 in the preferred embodiment. These return package offerings may be displayed on the consumer's appliance 52 (see, for example, FIG. 2D).

Figure 10:
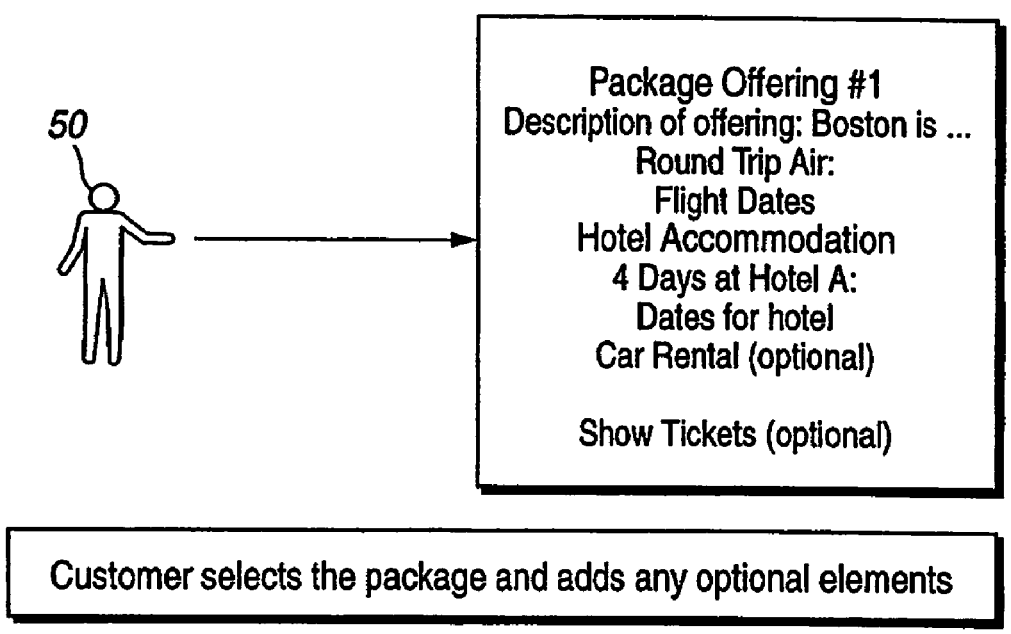
FIG. 10 shows an example consumer packaging offering including optional elements.

The package(s) at this point contains all the basic elements needed but additional or optional items can be added with or without the benefit of a discount or incentive. FIG. 10 shows an example process in which a consumer 50 may select optional items (e.g., car rental, show tickets, etc.).

Once the consumer makes a decision to buy a certain package, a set of transactions get executed in a predetermined order. This set of executions entails a significant amount of work partially on the front end and mostly on the back end 200 of the system. A standard nomenclature would be to call this an order-flow process or from the buying consumer viewpoint a fulfillment process.

The consumer is first apprised of his order by visual display (see, e.g., FIG. 2H). Further, a more reliable and definite kind of notification is issued (either through written or electronic mail). In successive steps a subset of the following transactions (not necessarily in the sequence indicated below) take place as shown in FIG. 11A-11D.

The order is executed either entirely electronically or with partial help of operators in the event that certain transactions cannot be automated or requires more detailed attention (FIG. 11A).

For the selected package, the available amount is decreased by the number purchased by the consumer (Figure I113).

After confirmation of the order by the seller (which again could be done via an electronic check of approval codes and/or an operator assisted set of interventions), a written or electronic document is issued to the buyer with additional relevant information confirming the selection and providing additional information that the seller chooses to include (examples could be detailed itinerary, description of events or places, travel times) (FIG. 11C).

Relevant information is stored on the back end for potential optimization of the affinity algorithm and other relevant (required or optional) use such as reporting and analysis (FIG. 11D).

Information is stored for consumer feedback and ratings.

The processes described in the sections above can be repeated as products become available or as the consumer decides to execute more purchases of packages presented to him that fit his particular set of constraints.

Example Extrapolative System

Figure 20:
FIG. 20 shows a screen format generated by the computer system of FIG. 12 for storing a departure date.
Figure 12:
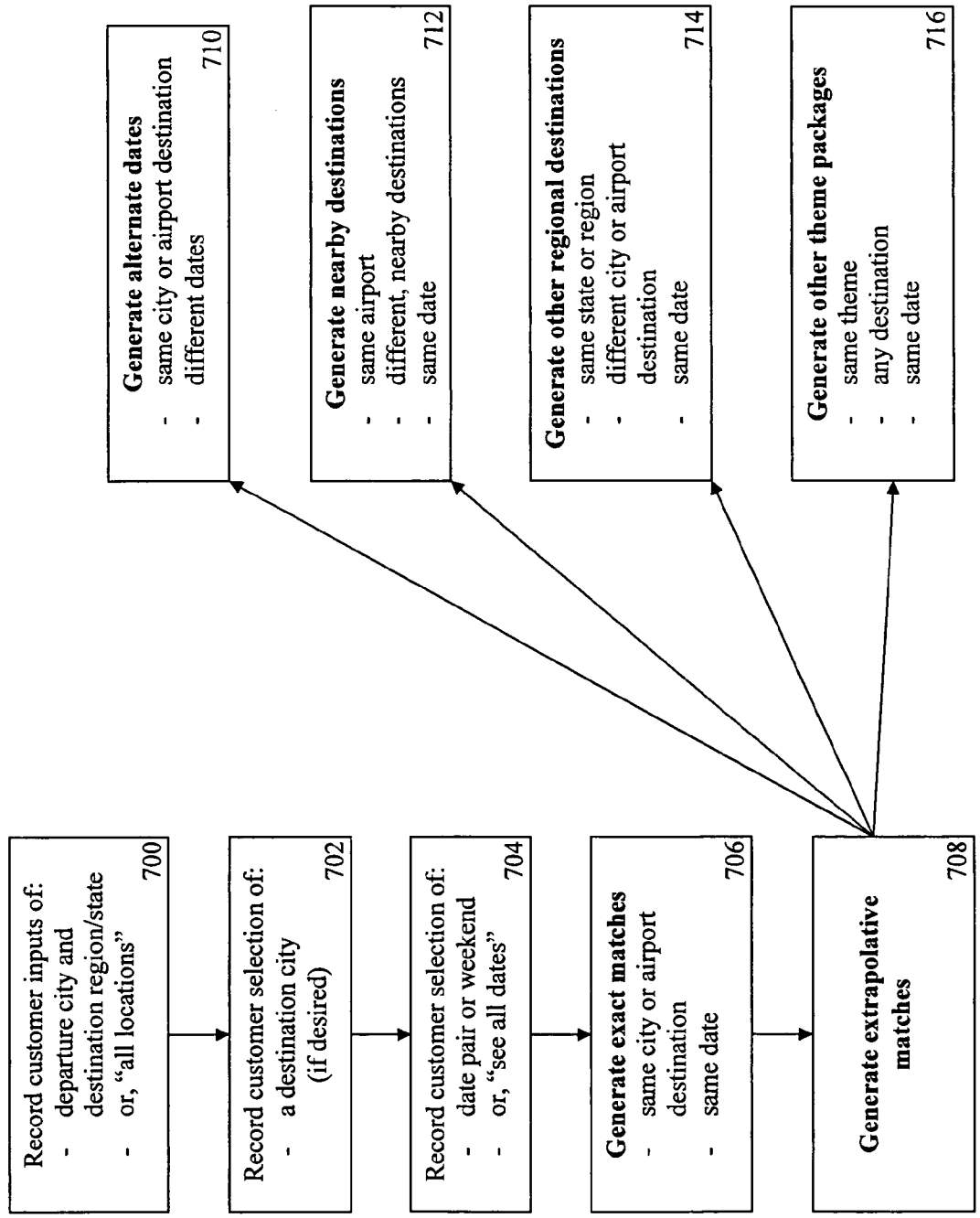
FIG. 12 shows a schematic of another embodiment of a computer system of the present invention configured to find or generate several travel packages based on extrapolations of consumer selections.

In yet another embodiment, the system 20 of the present invention is configured to provide a range of candidate packages without the input of mood criteria by the consumer and with a minimal number of selections by the consumer 50. For example, the system may be modified to have logic or processes 700, 702 and 704 for storing consumer inputs, as shown in FIG. 12. Process 700 includes storing consumer 50's input of a departure city and a destination region or state via the consumer appliance 52, such as by using drop down menus on the web pages illustrated in FIGS. 17 and 18. Process 702 records consumer selection of a destination city, such as by using the web pages illustrated in FIG. 19. Alternatively, this step may be skipped if the consumer selected an "all locations" option in the previous step. Process 704 includes storing selection of a date pair, including a departure date (as shown in FIG. 20) and a return date (as shown in FIG. 21).

Although this embodiment is illustrated as storing a location and a date, it should be noted that the system 20 may be configured to record more information, such as consumer mood or other information as described in the embodiments above, or less information, such as just a destination and no date at all. However, this embodiment has the advantage of storing relatively limited information and still returning a range of options based on an extrapolation using a small amount of information, as opposed to the limiting process of most conventional systems wherein additional information is used to reduce the scope of products offered. Restated, conventional systems focus on storing additional information that is used to narrow choices wherein the present system uses selections recorded from consumers and presents the consumers with a large composite of expanded choices with minimal repetitive entries of information, or multiple "clicks" retrace old steps and find different, but related packages with a unifying theme, date, destination, etc.

Referring again to FIG. 12, the system 20 also includes a process 706 to generate exact matches of the recorded consumer selections and a process 708 to generate extrapolative matches. Process 706 includes logic and/or steps for finding exact matches for the date or date pair and the destination, wherein both of these inputs are used as consumer constraints for selecting a subset of schema meeting the constraints or as mandatory element schema for fitting using the affinity algorithm, as is illustrated in FIG. 3B by processes 260, 262, 264, 266 and 268. Notably, the process 706 of generating exact matches could also have no affinity criteria but might simply be configured to list matching preexisting packages stored on database 400 meeting the required date and destination of the consumer. In another option, the exact matches might be ordered by price or popularity and truncated after a number of results (e.g., 3, 4, 5) so as to be of a manageable size.

The term "exact match" as used herein is a relative term. The term is meant to connote that a package has the elements that meet the criteria requested by a consumer. Obviously, there will be parts of the package that do not exactly meet all criteria "exactly" as requested by the consumer. To clarify this, the term "substantially matching" is sometimes used herein. Exact match is used to contrast with packages determined through the system by extrapolation. Exact matches are those travel packages are those packages that most closely resemble the request by a consumer, while extrapolated matches are those packages that may match the consumer's request based on data or characteristics provided as part of the consumer's request.

In addition, although the above-described embodiments are largely configured to build the package element by accessing the computer reservation system 208 or other supplier databases 210, this extrapolative embodiment may be configured to merely match the consumer constraints (e.g., date and destination) to a selection of already constructed packages or package elements held in a cache associated with database 400. For example, such a caching system is described in commonly owned U.S. patent application Ser. No. 10/635,273, filed Aug. 6, 2003 and entitled SYSTEMS, METHODS, AND COMPUTER PROGRAM PRODUCTS FOR STORING AND RETRIEVING PRODUCT AVAILABILITY INFORMATION FROM A STORAGE CACHE which is hereby incorporated herein in its entirety by reference. In particular, application Ser. No. 10/635,273 discloses caching the availability of packages and package elements using a fall-off function that instructs the cache to update availability information for check-in, flight dates, etc. that occur sooner more frequently than dates that occur farther out. The caching system can also update more or less often based on other factors such as popularity of particular destinations or times of year. Regardless, use of such a caching system accelerates the generation of the exact matches by process 706 and extrapolative matches by process 708 by providing a quickly accessible collection of packages and package elements.

Amongst the possible extrapolative matching processes that can be included in process 708 are an alternate date generation process 710, a nearby destination generation process 712, a regional destination generation process 714 and a theme package generation process 716, as shown in FIG. 12. It should be noted that other types of extrapolative processes could also be employed to expand further the travel options available to the consumer without excessive searching or entry of increasing amounts of information.

Figure 13:
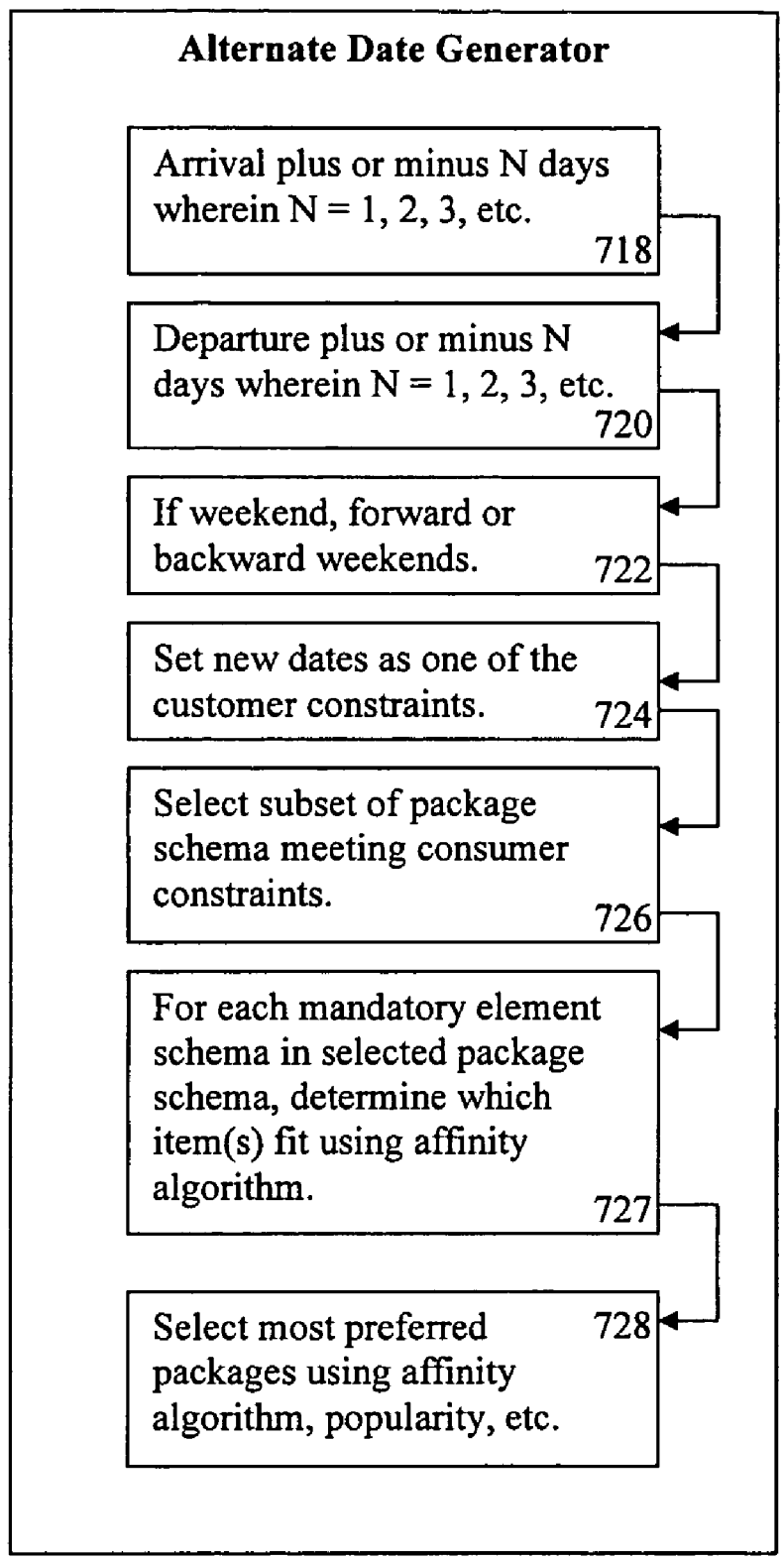
FIG. 13 shows a schematic of an alternative date generator of the computer system of FIG. 12.

The alternate date generation process 710 uses the same city or airport destination selected by the consumer but varies the date range. For example, as shown in FIG. 13, the alternate date generation process 710 may be configured to implement the steps 718, 720 of adding or subtracting N days (wherein N equals some integer) to or from the arrival or departure dates. If a weekend is selected by the consumer, then in an additional, or alternative, step 722 a selected number of preceding and/or succeeding date pairs could be used as the alternate dates. These alternate dates are then set as consumer constraints (step 724) used to select subset schema (step 726) meeting the alternative date constraints and the same destination, and these schema are applied to select the appropriate packages and package elements (step 727). As an optional, additional step, the number of packages displayed may be truncated by showing preference, in step 728, to more popular packages, packages better fitting the affinity algorithm (e.g., by using algorithm 268), less expensive packages, etc.

In lieu of constructing a package, the alternative dates calculated by steps 718, 720 and/or 722, or by some other extrapolative algorithm, could be used to search and identify cached packages on database 400 that match the alternative date criteria and the consumer selected destination.

Additional description of systems and processes for calculating alternative dates can be found in commonly owned U.S. Patent Application No. 60/573,546 filed on May 21, 2004 and entitled SYSTEMS, METHODS, AND COMPUTER PROGRAM PRODUCTS FOR SEARCHING AND DISPLAYING LOW COST PRODUCT AVAILABILITY INFORMATION FOR A GIVEN DEPARTURE-RETURN DATE COMBINATION OR RANGE OF DEPARTURE-RETURN DATE COMBINATIONS and hereby incorporated herein by reference.

Figure 14:
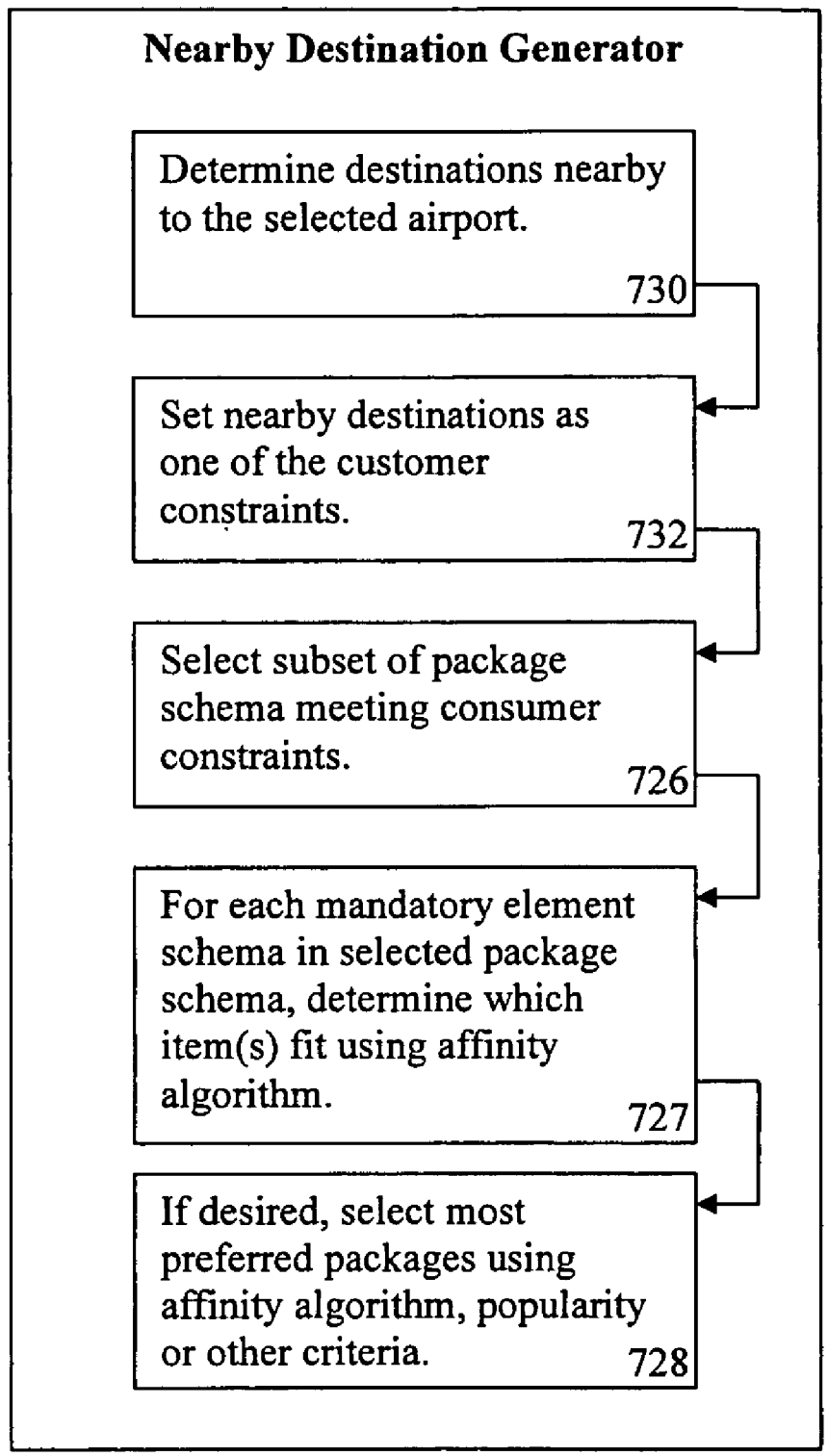
FIG. 14 shows a schematic of a nearby destination generator of the computer system of FIG. 12.
Figure 15:
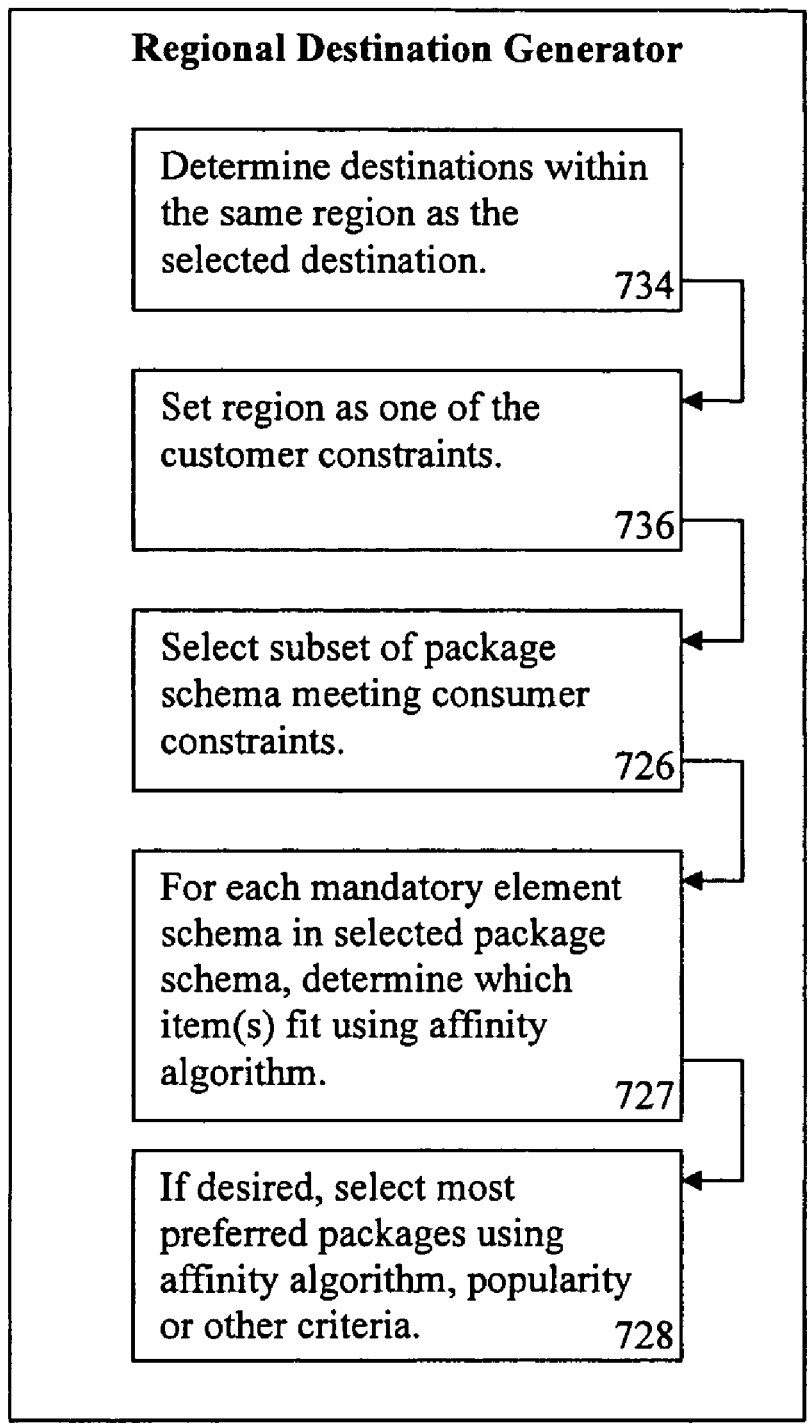
FIG. 15 shows a schematic of a regional destination generator of the computer system of FIG. 12.

The nearby destination generation process 712 includes steps for relaxing the consumer constraint on the destination location to require the same airport for arrival but to allow construction or selection of packages having destinations within a reasonable range of the same airport, as shown in FIG. 14. In particular, the airport of the selected location is identified and then an algorithm is applied to determine (step 730), based upon factors such as linear distance, travel time, travel expense, popularity or operator constructed groupings or clusters, which destinations are reasonably close, convenient and/or interesting enough to the airport of the consumer selected destination to qualify as "nearby destinations." For example, the algorithm could include mapping the location of the airport and determining destination locations within a limited 100, 200 or 300 mile radius of the airport location.

Regardless of how they are determined, these nearby destinations are then set as consumer constraints (step 732) used to select subset schema (step 726) meeting the same selected date and nearby destination constraints, and the schema are applied to select the appropriate packages and package elements (step 727). As above, the limiting step of 728 can also be applied to truncate the packages based on the affinity algorithm results, popularity, price, elimination of duplicates or other criteria. In lieu of constructing a package, the nearby destinations determined in step 730 could be used to search and identify all cached packages stored on database 400 that match the nearby destination criteria and the consumer selected date.

The regional destination generation process 714 includes steps for relaxing the consumer constraint on the destination location even further wherein the same airport is no longer required, only the same region. Regions could include areas as large as several countries (e.g., the Caribbean), a collection of states (e.g., New England, the South or Mid Atlantic) or destinations within a single state or county. Typically, these regions will be set into grouping selected by experienced operators 64 who are conversant with the motivations of the consumers or unifying characteristics of the region (e.g., tropical climate and beaches of the Caribbean or the Florida Keys). Alternatively, regions may be determined algorithmically using distance, travel time, convenience, weather or other factors to determine new regions dynamically or independent of human intervention.

Regardless of how they are determined, these regional destinations are then set as consumer constraints (step 736) used to select subset schema (step 726) meeting the alternative date constraints and the same destination, and these schema are applied to select the appropriate packages and package elements (step 727). As above, the limiting step of 728 can also be applied to truncate the packages based on the affinity algorithm results, popularity, price or other criteria. In lieu of constructing a package, the nearby destinations determined in step 734 could be used to search and identify all cached packages stored on database 400 that match the regional destination criteria and the consumer selected date.

For additional cost savings, the present invention could also include processes for determining a range of additional, nearby or regional departure airports by relaxing the departure city criteria. Additional details on an exemplary system for relaxing destination or departure airport criteria—in this case to determine alternative departure and destination airports within a region—is disclosed in commonly owned U.S. patent application Ser. No. 09/275,887 filed Mar. 25, 1999 and entitled METHODS AND APPARATUS FOR DETERMINING NON-OBVIOUS SAVINGS IN THE PURCHASE OF GOODS AND SERVICES which is hereby incorporated herein in its entirety by reference.

Figure 16:
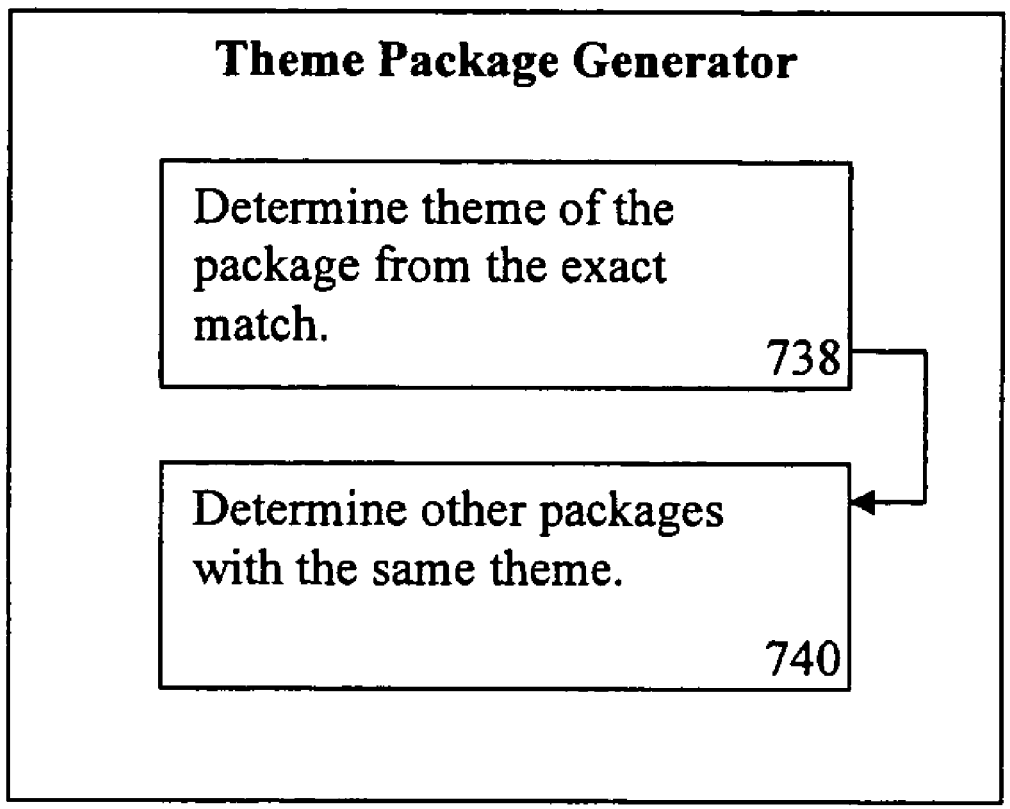
FIG. 16 shows a schematic of a theme package generator of the computer system of FIG. 12.

The theme destination generation process 716 includes a step 738 for extracting a theme from the results of the exact match generation process 706, as shown in FIG. 16. For example, each available package cached on the database 400 may have already been separated by one of the operators 64 into groups belonging to each of several themes, such as Beach, Big City, Casino, Golf, Family, Offbeat, Historical, Music & Food, and Outdoor & Adventure. These groupings are recorded as part of the data associated with existing packages on the database 400, such as when reviewing available items from external systems, as shown in FIGS. 4A, 4B and 4C. Alternatively, each of the packages on the database 400, or the package schema used to construct the offering (as shown in FIGS. 7A, 7B, 7C and 7D) may be grouped into one of the theme categories on a list stored on the database 400.

Regardless of how the theme is assigned, upon determination of the appropriate package by the exact match generation process 706, the theme assigned to the package is determined from its associated schema used to construct the package or the package is compared to the list of packages in each theme on the database 400 to find a matching theme. In step 740, the other packages with the same theme are determined either by building other packages meeting the same schema (e.g., by repeating steps 726, 727 and 728 with the schema having the theme as a constraint) or by merely obtaining the remaining packages that are associated with the theme and stored in the cache.

In another option, the theme of a package constructed using the exact match generation process 706 may be extracted by essentially reversing the affinity algorithm illustrated in FIG. 6. For example, instead of assembling elements to form a package, a package that has been received as a whole from a supplier can be broken down into individual items and then each element compared to existing elements stored on database 400 and having affinity ratings associated therewith. The affinity ratings of the elements in the package can then be analyzed to determine trends and which are used to identify themes. For example, if on average the highest average affinity rating for all of the elements is "golf" then in step 740 packages could be selected or constructed that have similarly high golf affinities or themes.

In yet another variation, the theme may be determined directly from the information provided by the consumer, such as from the date and location. For example, if the date is during Mardi Gras and the location is New Orleans, the theme might be "Big Parties" which also includes packages to Savannah, Ga. on St. Patrick's Day. Of course it should be noted that other ways of determining themes may be used to extrapolate off of limited consumer supplied information and still fall within the purview of the present invention.

Figures 17, 18:
FIG. 17 shows a screen format generated by the computer system of FIG. 12 for storing a departure city.
FIG. 18 shows a screen format generated by the computer system of FIG. 12 for storing a destination region.
Figure 19:
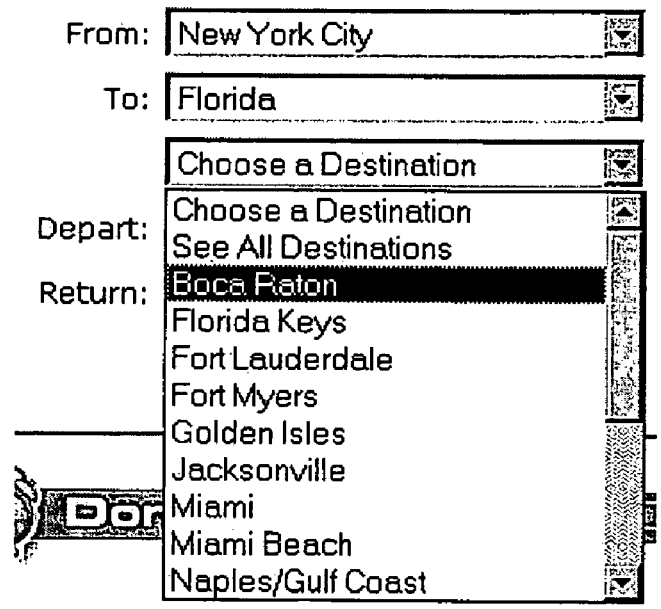
FIG. 19 shows a screen format generated by the computer system of FIG. 12 for storing a destination city.
Figure 20:
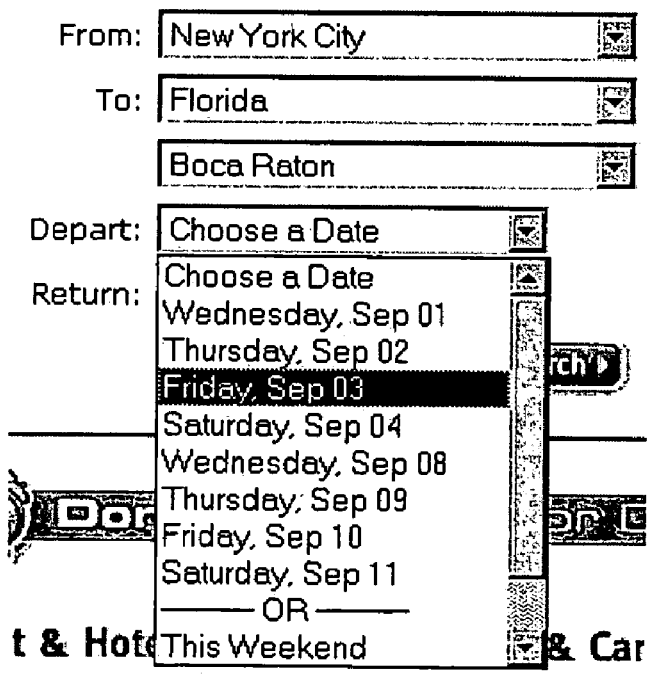

As an exemplary use of the embodiment illustrated in FIGS. 12-16 of the system 20, the consumer enters a "from" or departure city as New York City in the drop down menu, as shown in FIG. 17. Then, the consumer uses another drop down menu to select a region or state for the destination, in this case Florida, as shown in FIG. 18. The destination is then more specifically identified by a city selection, Boca Raton, in a third drop down menu on the same screen, as shown in FIG. 19. Dates are selected from drop down menus including a departure date of Friday, September $3^{rd}$ in FIG. 20 and a return date of Sunday, September $5^{th}$ in FIG. 21 so as to form a single date pair. The consumer then hits a search button to generate the results.

Subsequent to executing the steps described above to determine exact matches 706 and extrapolative matches 708, the system 20 displays the available packages, as shown in FIG. 22. FIG. 22 illustrates a single screen with the exact match, in this case a flight to Boca Raton departing September $3^{rd}$ and returning September $5^{th}$, exactly as requested. However, a total of sixteen other extrapolative matches are also provided. For example, under an alternate dates heading packages to Boca Raton are listed with departure dates on September $2^{nd}$ and $4^{th}$, and return dates on September $6^{th}$.

Under a nearby destinations heading, results are listed showing packages to West Palm Beach and Vero Beach (both with flights into West Palm Beach) for the same date pair requested. For other destinations in the region, several other packages to Florida are listed, including packages to Miami and Fort Lauderdale. Finally, other destinations with the same theme, in this case a beach theme based on identification of a strong beach affinity rating or simply by detection of Boca Raton in a beach theme category, are listed including Cancun, Mexico which is, notably, not even in the same region. Also notable is that no duplicate packages are listed, thereby ensuring a large number of non-repetitive results for a relatively low amount of information entries by the consumer. Also advantageous is that the wide range of destinations are still associated indirectly with the original information, but do not require steps backwards and reentry of information in the forms with minor variations to return all the results listed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer system for providing a wide range of travel packages to a consumer based on limited entry of information, said computer system comprising:

data storage comprising travel information used for generation of travel packages;

a travel package matching system in communication with said data storage, said travel package matching system configured to provide a selection of substantially matching travel packages to the consumer based on travel selection data including a date of travel and a destination location stored in a memory, wherein each substantially matching travel package comprises a plurality of preassembled travel components or a plurality of travel components combined by the travel package matching system; and an extrapolative matching system in communication with said data storage, said extrapolative matching system configured to:

extract a theme from the selection of substantially matching travel packages; and generate a selection of additional and different travel packages from the selection of substantially matching travel packages based on the theme without consumer intervention.

2. A computer system according to claim 1, further comprising:

a truncation system configured to reduce the selection of additional and different travel packages, said truncation system uses pruning criteria stored in the memory of the computer system, wherein the stored pruning criteria are determined independent of the travel selection data.

3. A computer system according to claim 2, wherein the stored pruning criteria includes at least one of a screen size limit, a non-duplication requirement, a price range or a popularity rating, wherein said truncation system uses the pruning criteria to reduce the number of additional and different travel packages.

4. A computer system according to claim 3, wherein the stored pruning criteria includes each of a screen size limit, a non-duplication requirement, a price range and a popularity rating, wherein said truncation system uses the pruning criteria to reduce the number of additional and different travel packages.

5. A computer system according to claim 1, wherein the travel selection data are selected from a group consisting of a departure date, a return date, a departure location and the destination location and said travel package matching system provides a selection of substantially matching travel packages to the consumer based on the limited travel selection data.

6. A computer system according to claim 1, wherein the extrapolative matching system includes at least one of:

a nearby destination identification system configured to provide additional and different travel packages having a common airport;

a regional destination identification system configured to provide additional and different travel packages within a same region;

a theme extraction system configured to extract a theme from the selection of substantially matching travel packages; or a theme identification system configured to provide additional and different travel packages having a same theme as the substantially matching travel packages.

7. A computer system according to claim 1, wherein the extrapolative matching system is configured to extract a theme from at least one of:

a theme pre-assigned to one or more of the substantially matching travel packages;

schema associated with one or more of the substantially matching travel packages;

affinity ratings of one or more elements in one or more of the substantially matching travel packages; or the travel selection data.

8. A computer system for providing a wide range travel packages to a consumer based on limited entry of information, said computer system comprising:

a travel package matching system configured to provide a selection of substantially matching travel packages to the consumer based on limited travel selection data including a date of travel and a destination location, wherein each substantially matching travel package comprises a plurality of preassembled travel components or a plurality of travel components combined by the travel package matching system;

an extrapolative matching system configured to extract a theme from the selection of substantially matching travel packages and generate a selection of additional and different travel packages from the selection of substantially matching travel packages based on the theme without consumer intervention; and a truncation system configured to reduce the selection of additional and different travel packages using pruning criteria stored in a memory of the computer system, wherein the stored pruning criteria are determined without requiring additional travel selection data from the consumer.

9. A computer system according to claim 8, wherein the extrapolative matching system includes at least one of:

a nearby destination identification system configured to provide additional and different travel packages having a common airport;

a regional destination identification system configured to provide additional and different travel packages within a same region;

a theme extraction system configured to extract a theme from the selection of substantially matching travel packages; or a theme identification system configured to provide additional and different travel packages having a same theme as the substantially matching travel package.

10. A computer system according to claim 9, further comprising a cache storing a plurality of pre-constructed travel packages searchable by the systems for providing the substantially matching and additional and different travel packages.

11. A computer system according to claim 9, wherein the extrapolative matching system comprises a theme extraction system, and wherein the theme extraction system is configured to determine affinity ratings from the selection of substantially matching travel packages and identify a trend in the affinity ratings.

12. A computer system according to claim 9, wherein the extrapolative matching system comprises a nearby destination identification system, a regional destination identification system, or a theme identification system, and wherein each of the nearby destination identification system, the regional destination identification system, and the theme identification system is configured to assemble the additional and different travel packages using an affinity algorithm.

13. A method for providing a wide range of travel packages to a consumer based on limited entry of information, said method comprising:

storing in memory travel selection data including a date of travel and a destination location from the consumer;

providing a selection of substantially matching travel packages to the consumer based on the travel selection data, wherein providing comprises selecting substantially matching travel packages each comprising a plurality of preassembled travel components or combining a plurality of travel components in order to generate a selection of substantially matching travel packages;

extracting a theme from the selection of substantially matching travel packages;

generating a selection of additional and different travel packages from the selection of substantially matching travel packages based on the theme without consumer intervention; and providing the selection of additional and different travel packages to the consumer.

14. A method according to claim 13, further comprising:
determining pruning criteria independent of the travel selection data; and
truncating the selection of additional and different travel packages using the pruning criteria.

15. A method according to claim 14, wherein determining the pruning criteria includes determining a screen size of the display used by the consumer and truncating the selection of additional and different travel packages includes truncating the selection of additional and different packages to fit the screen size.

16. A method according to claim 15, wherein truncating the selection of additional and different travel packages includes eliminating duplications.

17. A method according to claim 13, wherein storing the travel selection data includes storing data consisting of at least one of a departure date, a return date, a departure location and the destination location.

18. A method according to claim 13, wherein extracting a theme from the substantially matching travel packages includes identifying a trend in affinity ratings of the substantially matching travel packages.

19. A method according to claim 13, wherein extracting a theme comprises extracting a theme from at least one of:
a theme pre-assigned to one or more of the substantially matching travel packages;
schema associated with one or more of the substantially matching travel packages;
affinity ratings of one or more elements in one or more of the substantially matching travel packages; or
the travel selection data.

20. A computer program product for providing a wide range of travel packages to a consumer based on limited entry of information, the computer program product comprising at least one computer-readable storage medium having computer-readable program code portions stored therein, the computer-readable program code portions comprising:
a first executable portion for storing into memory travel selection data including a date of travel and a destination location from the consumer;

a second executable portion for providing a selection of substantially matching travel packages to the consumer based on the travel selection data wherein the second executable portion is configured to select substantially matching travel packages each comprising a plurality of preassembled travel components or combine a plurality of travel components in order to generate a selection of substantially matching travel packages;

a third executable portion for extracting a theme from the selection of substantially matching travel packages;

a fourth executable portion for generating a selection of additional and different travel packages from the selection of substantially matching travel packages based on the theme without consumer intervention; and a fifth executable portion for providing the selection of additional and different travel packages to the consumer.

21. A computer program product according to claim 20, further comprising a sixth executable portion for determining pruning criteria independent of the travel selection data and truncating the selection of additional and different travel packages using the pruning criteria.

22. A computer program product according to claim 21, further comprising a seventh executable portion for determining a screen size of the consumer's display and truncating the selection of additional and different packages to fit the screen size.

23. A computer program product according to claim 22, further comprising an eighth executable portion for truncating the additional and different packages by eliminating duplications.

24. A computer program product according to claim 20, further comprising a ninth executable portion for storing data consisting of at least one of a departure date, a return date, a departure location and the destination location.

25. A computer program product according to claim 20, further comprising a tenth executable portion for identifying a trend in affinity ratings of the substantially matching travel packages and using the trend to determine the theme.

26. A computer program product according to claim 20, wherein the third executable portion is further configured to extract a theme from at least one of:
a theme pre-assigned to one or more of the substantially matching travel packages;
schema associated with one or more of the substantially matching travel packages;
affinity ratings of one or more elements in one or more of the substantially matching travel packages; or
the travel selection data.

* * * * *

UNITED STATES PATENT AND TRADEMARK OFFICE
CERTIFICATE OF CORRECTION

| | |
|---|---|
| PATENT NO. | : 7,395,220 B2 |
| APPLICATION NO. | : 11/215220 |
| DATED | : July 1, 2008 |
| INVENTOR(S) | : Abrams et al. |

It is certified that error appears in the above-identified patent and that said Letters Patent is hereby corrected as shown below:

<u>Column 11,</u>

Line 49, "acconiunodations" should read --accommodations--.

<u>Column 14,</u>

Line 50, "Operatings" should read --Operations--.

Signed and Sealed this

Fourteenth Day of October, 2008

JON W. DUDAS
*Director of the United States Patent and Trademark Office*